United States Patent
Gorshkov

(12) 
(10) Patent No.: US 6,561,856 B1
(45) Date of Patent: May 13, 2003

(54) POWER FLOATING PRODUCTION AND SHIP PROPULSION SUPPORTED BY GYROSCOPE AND ENERGIZED BY SEAS

(76) Inventor: Vladislav Vasilyevich Gorshkov, 2701, S. Fern str. #9, Arlington, VA (US) 22202

( * ) Notice: Subject to any disclaimer, the term of this patent is extended or adjusted under 35 U.S.C. 154(b) by 0 days.

(21) Appl. No.: 09/777,846

(22) Filed: Feb. 7, 2001

(51) Int. Cl.⁷ .............................................. B63H 19/02
(52) U.S. Cl. ............................................ 440/9; 440/13
(58) Field of Search .................. 440/9, 10, 13–15, 440/22; 114/121, 124, 126; 290/53, 54; 60/497–507; 416/79–83

(56) References Cited

U.S. PATENT DOCUMENTS

| | | | | |
|---|---|---|---|---|
| 468,668 A | * | 2/1892 | Lowe ............................. | 440/9 |
| 1,573,343 A | * | 2/1926 | Holeka ........................ | 114/191 |
| 2,048,339 A | * | 7/1936 | Kalfas ........................... | 440/9 |
| 2,364,535 A | * | 12/1944 | Kapolkin ....................... | 440/9 |
| 2,466,164 A | * | 4/1949 | Evans ......................... | 114/191 |
| 2,517,612 A | * | 8/1950 | Varian ........................ | 74/5.34 |
| 2,533,217 A | * | 12/1950 | Braddon ..................... | 114/191 |
| 2,617,376 A | * | 11/1952 | Evans ......................... | 114/191 |
| 3,265,029 A | * | 8/1966 | Laurenti ..................... | 114/122 |
| 3,861,487 A | * | 1/1975 | Gill ............................ | 180/65.3 |
| 4,118,932 A | * | 10/1978 | Sivill .......................... | 60/500 |
| 4,300,871 A | * | 11/1981 | Laithwaite et al. ......... | 417/331 |
| 4,352,023 A | * | 9/1982 | Sachs et al. .................. | 290/42 |
| 4,514,644 A | * | 4/1985 | Westling ...................... | 290/53 |
| 4,598,547 A | * | 7/1986 | Danihel ....................... | 60/507 |
| 4,781,023 A | * | 11/1988 | Gordon ....................... | 60/506 |
| 4,842,560 A | * | 6/1989 | Lee ............................... | 440/9 |
| 4,968,273 A | * | 11/1990 | Momot ........................ | 440/14 |
| 6,099,368 A | * | 8/2000 | Gorshkov ...................... | 440/9 |

* cited by examiner

*Primary Examiner*—S. Joseph Morano
*Assistant Examiner*—Ajay Vasudeva

(57) ABSTRACT

To access the inexhaustible energy source like seas and oceans we need to learn how to convert its wave motion to the customized power for our ships, for our existing littoral settlements and our future ocean settlements. Here is an attempt to develop method of the conversion the wave energy to power with floating means based on a gyroscope strong capability to resist against the outer force moment trying to tilt it to any side.

Figure 4A:
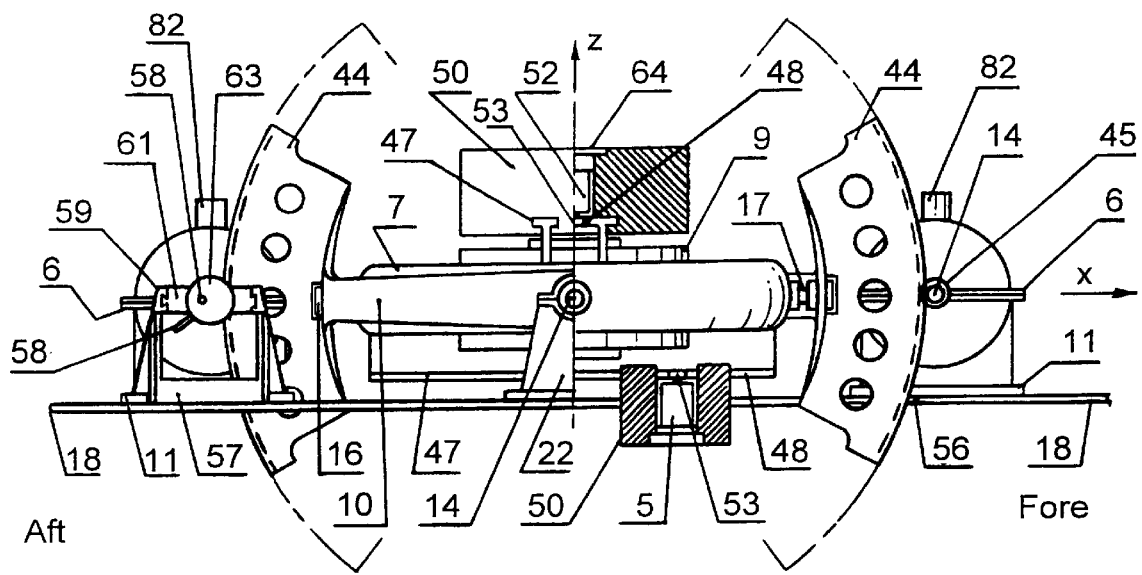

The gyroscope is used as the fulcrum torque dynamic supporting instead traditional static base used in the issued devices. Alternate force moment created by the waves and transmitted to the gyroscope (via the floating body and the wave energy converter) inducts alternative gyro precession so as the gyroscope axis hesitates about mean position. This is important because it allows the gyroscope to keep dynamic fulcrum torque in unlimited time.

The few gyroscope precession control devices and methods have been developed to compensate other reasons enforcing the mean gyro axis to drift from initial plumb.

Also here are developed the new ship architecture with the separated floating gyro section. The wagging propulsor driven by the pitching and with strokes amplified by the fulcrum gyro section, the spring moment generator for the gyroscope drift compensation, non gyroscope floating power station able to derive, convert, accumulate and transmit wave energy to consumer also have been developed here.

5 Claims, 10 Drawing Sheets

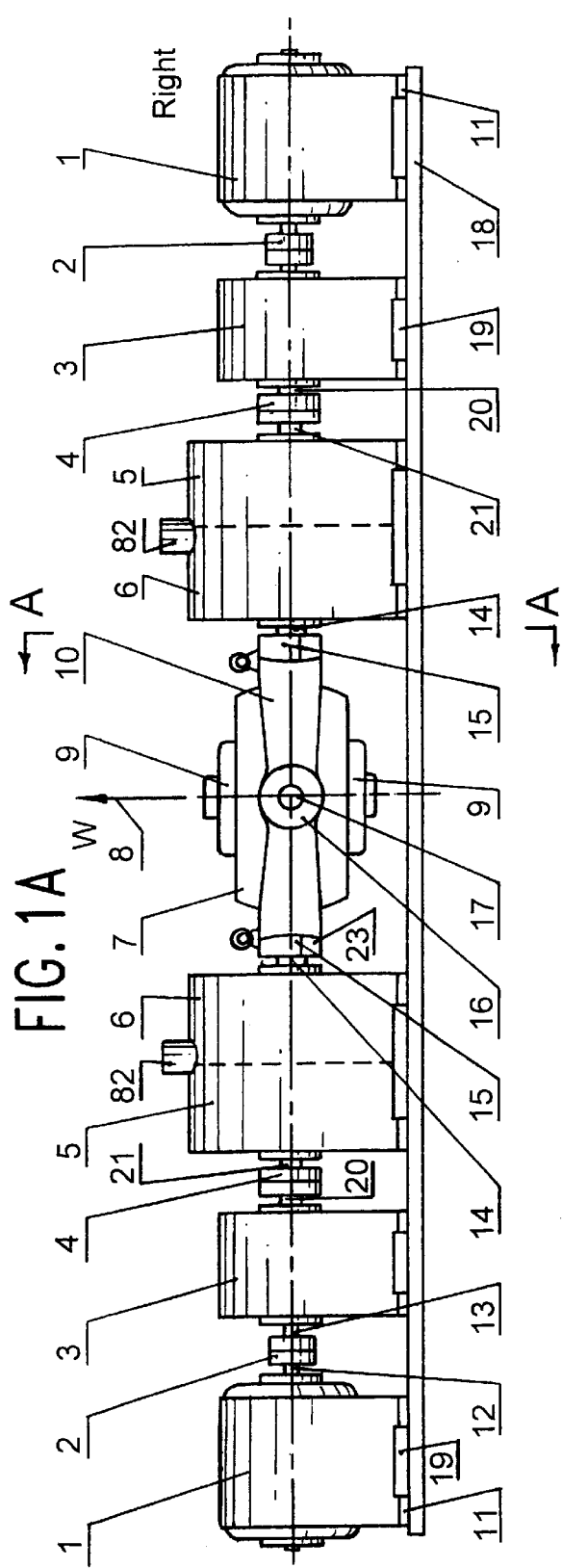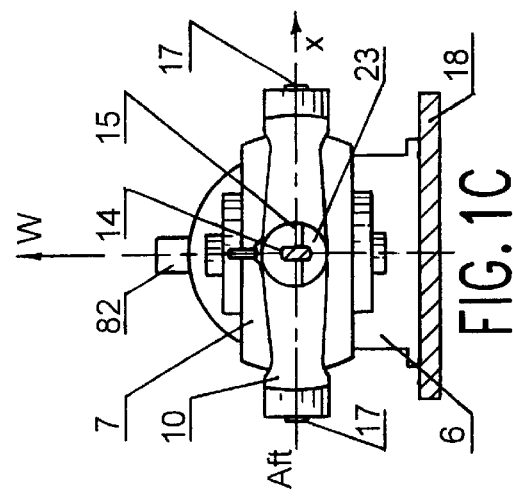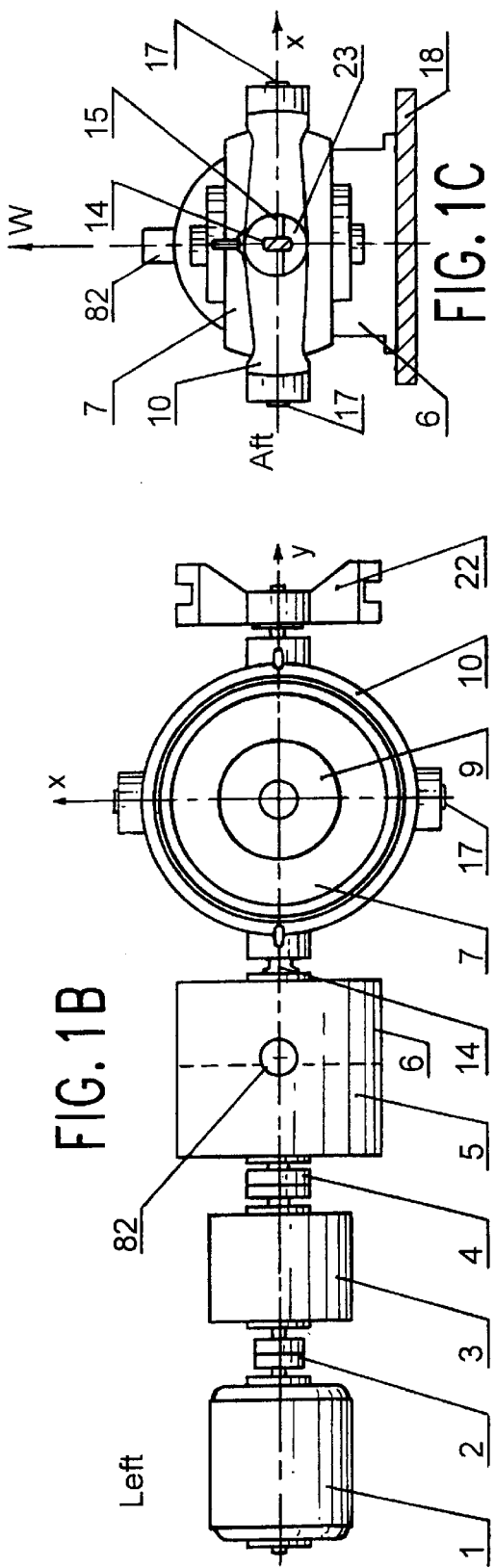

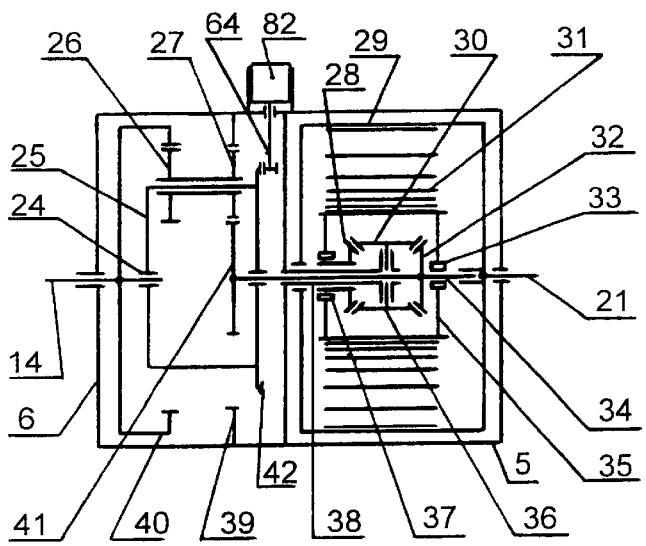
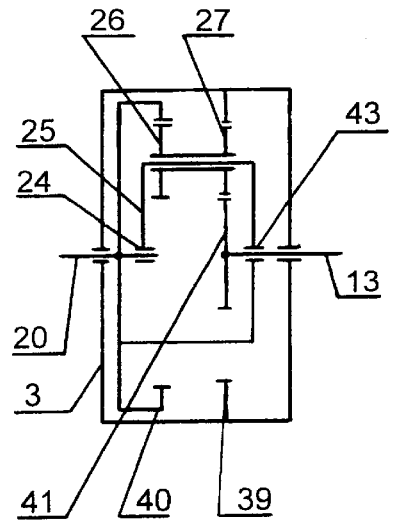
FIG. 2A
FIG. 2B
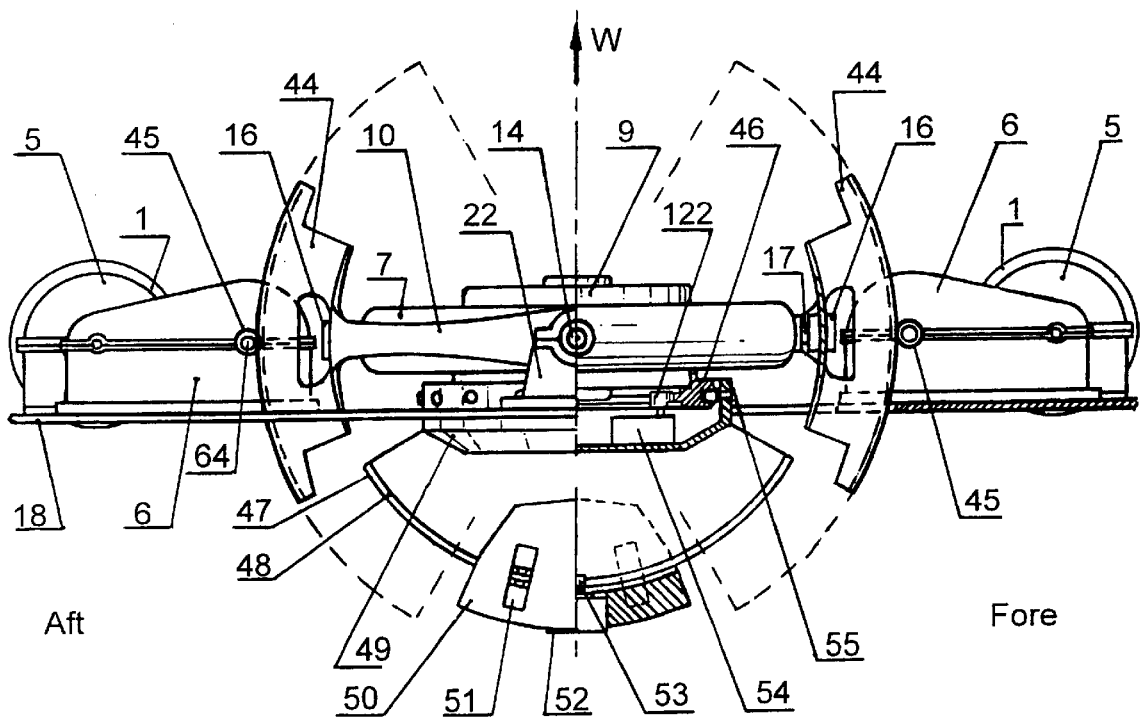
FIG. 3

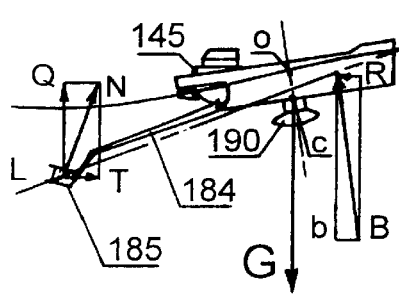
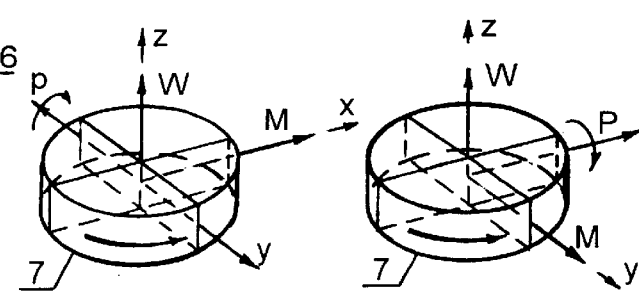
FIG. 14B
FIG. 15
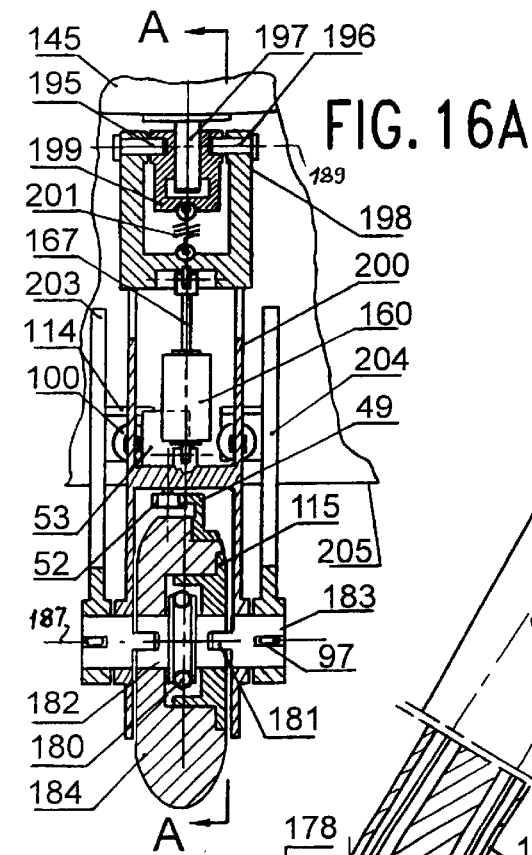
FIG. 16A
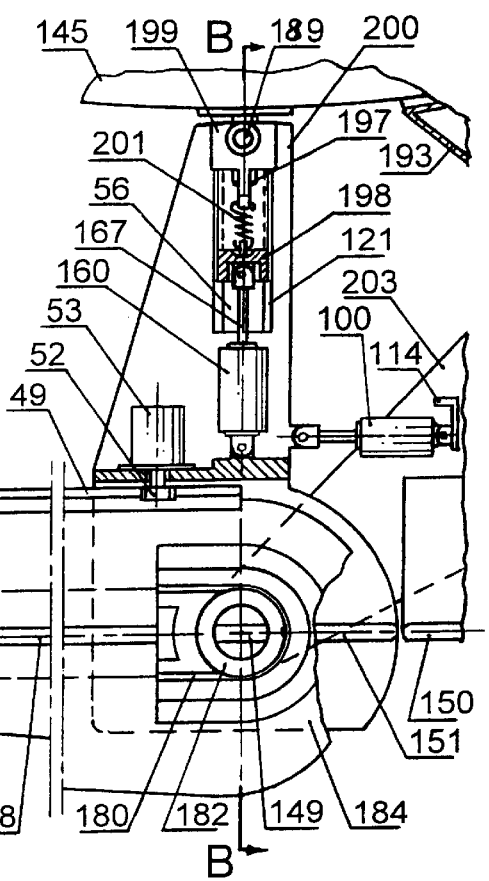
FIG. 16B

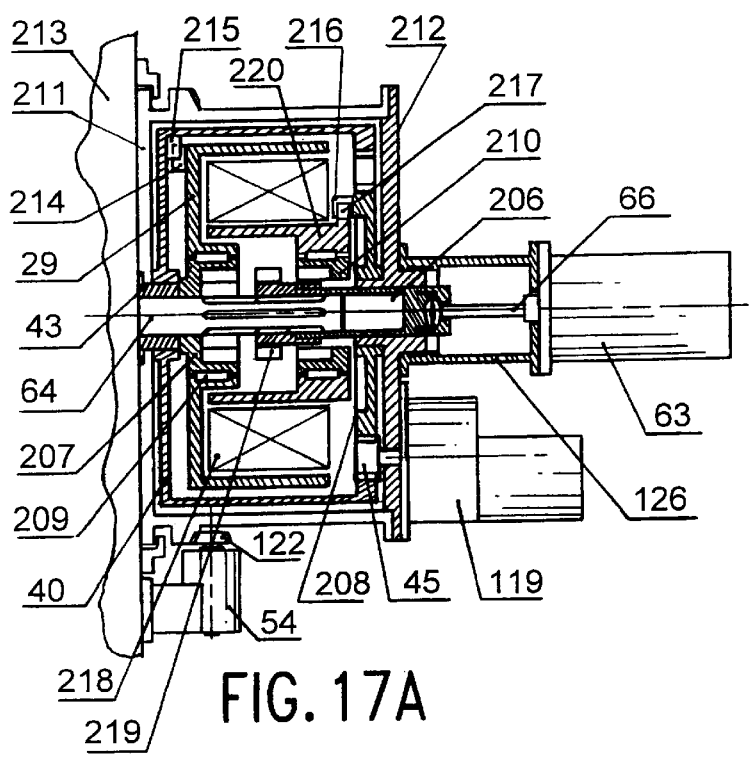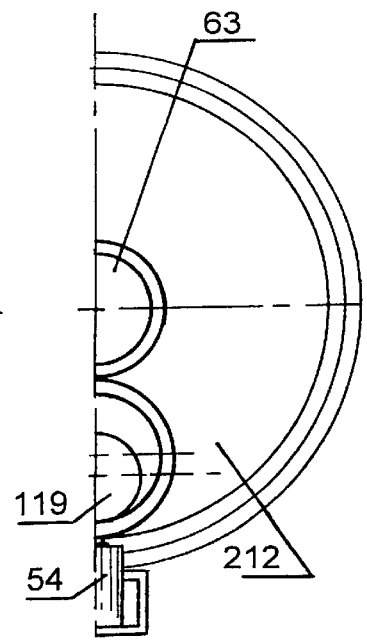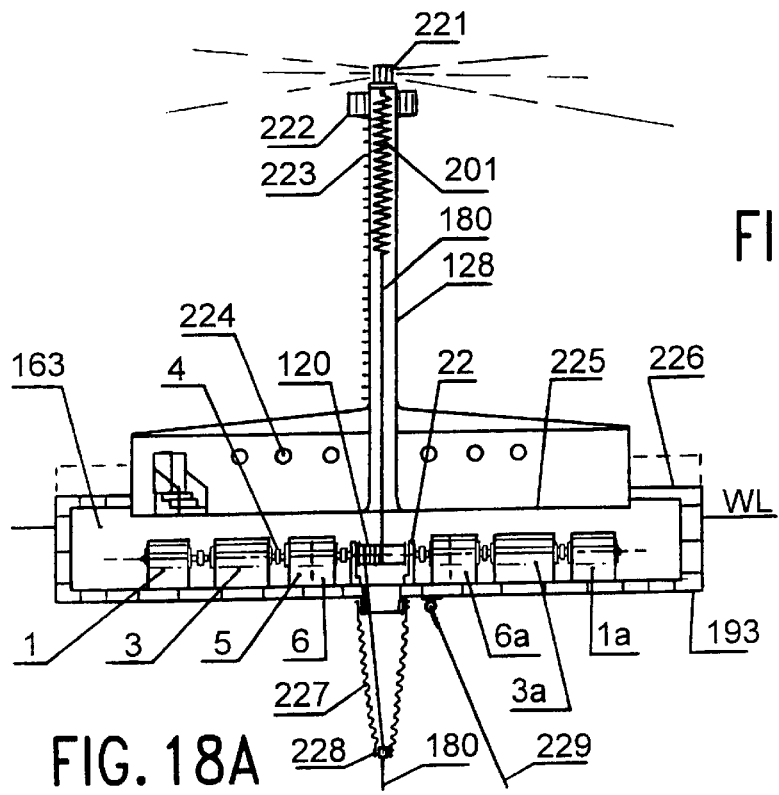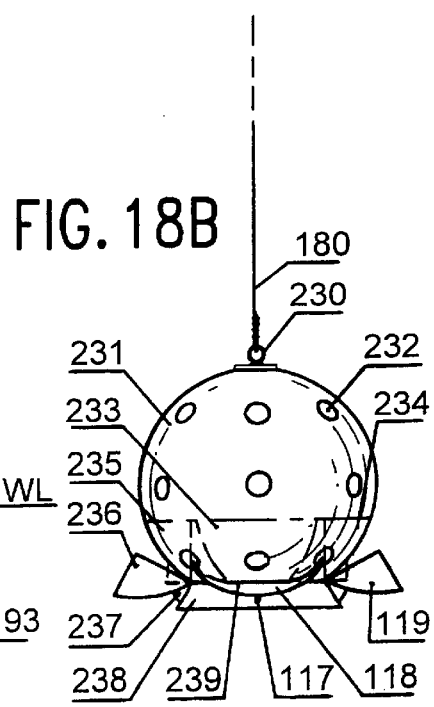

POWER FLOATING PRODUCTION AND SHIP PROPULSION SUPPORTED BY GYROSCOPE AND ENERGIZED BY SEAS

CROSS-REFERENCE TO RELATED APPLICATIONS

The U.S. Pat. No. 3,861,487 issued Jun. 21, 1975 is the nearest in the considered area. It suggests producing energy using movements between inertial parts of a vehicle. A vehicle can be any type: a car, an aircraft or water burn craft. Here we suggest utilizing rocking energy of water burn craft motion interacting with a carried gyroscope. The last one can keep its stable attitude and create reactive force moment much more effectively than the motionless inertia member of a vehicle when it is used for converting of rocking motion to power.

STATEMENT REGARDING FEDERAL SPONSORED R & D

The invention has been created by the author self with his own means in duty free time.

REFERENCE TO A MICROFICHE APPENDIX

Not applicable.

BACKGROUND OF THE INVENTION

Endeavor: Any rocking process carries energy. Seas produce the most powerful natural rocking. It should be used for powering of ships, bouts, others floating means and also to energize floating power plants. Here is given the method based on gyroscope capability to keep stable its angle attitude in space providing power extraction from rocking processes produced by seas. As positive results the method allows to:

furnish any rocking floating mean (a ship, a raft, a boat, . . . ) by the gyroscope supported rocking energized power (GRP-)plant producing electric or/and hydra-pneumatic power;

propel a ship with rocking energy transmitted to a propeller or wagging propulsor directly or through electromechanical and/or hydraulic converters;

build seas floating power plants for power supply seashore settlements or mass charging of accumulators by use old or special vessels and other water born crafts;

avoid noise and pollution of environment in compare with motor driven power stations.

The fields of invention issues are the rocking energized floating power production and ship propulsion supported with a gyroscope.

The way a problem is stated.

Floating means produces the most powerful natural rocking. As a general representative of it we will consider a ship. Rocking process contains energy. An each ship is a gainer of seas energy. The sea power expenditure can exceed the ordinary ship engine as much as few times. The only question is how to get it for power supply our necessities.

A usually mechanical energy conversion process consists of three components. The first one is provisionally still component while the second one (like a rotor, an engine piston) is relatively mobile which is moved by third gap component (expanding gas, electric field, etc . . . ) generating motive force. In our case the sea waves (second component) are rocking a ship body (third component) using the still sea bottom as the first component. But the sea bottom is remote and so can not be used here and must be substituted. The problem is where to take the first component in order to handle relative rocking motion it and the third component.

The proper component is a gyroscope. It has a capability to keep steady angle attitude in world coordinates even though it treats force moment. In our case this force moment originates from ship pitching and it is transmitted to the gyroscope through the energy consumer such as the GRP-plant. The steady torque support produces a reactive force moment as necessary condition for any rotary movement conversion.

The initial ship angular rocking motion like pitching or rolling characterized by small swings and velocity amplitudes. So the first stage of its conversion is to increase scale of that motion. Then it must be converted to one way revolution, tuned down, accelerated and we have the rotating shaft as output of the rocking energy converter. It can drive the ship propeller, a pump or/and electric power generator of carried GRP-plant in order to get power for accumulation and consumption.

Almost in all these cases we should have the step-up gearing which converts slow and small but powerful relative rocking motion of the ship body and the gyroscope frame to the fast shaft rotation. Even though the body is the initial rocking motion source but for an observer sitting on board it seems as if the gyroscope has angular motions and the ship does not. So for the converter it does not matter which component we will consider mobile.

The gyroscope treats the alternate force moment causing its alternate precession (hesitation). If to image Earth as motionless and force moments against the rocking are equal in both directions then the rocking will occur about some middle position (line) and gyroscope alternate precession will also occur about some mean direction line. The best line is the plumb. The gyro axis mean (GAM)-line must stay upright perfectly. But asymmetric rocking force moments, ship movements and Earth rotation (apparent precession) drift the GAM-line from the plumb. And this drift can lead the gyroscope to 'turn over' and stop to interact with the ship rocking. So we need to provide for the automated turning back the GAM-line to the plumb.

This is not a simple plant, but industry has sufficient experience to build platforms stabilized by gyroscope systems for different mobile objects and to create gearing with high speed up ratio. So it can produce the GRP-plants right now to rig floating objects.

The GRP-plants can give the next benefits:
1. Access to ecological clean natural energy sources.
2. Improvement all ship performance parameters right until whole scale ship power supply.
3. Creating new automated self powered floating objects for continuous navigation.
4. Power supply for coastal settlements and also sea and ocean settlements in the future.

BRIEF SUMMARY OF INVENTION

The general idea of the claimed invention is the utilization rocking process through interacting with gyroscope support. For that the rocking driven power plant should be mounted on a ship. The heart of the GRP-plant is the gyroscope fulcrum supporting. That GRP-plant can produce electricity, power a pressure hydra-pneumatic system, propel a sip or drive any other mechanical device.

The considering GRP-plant can be set on any floating mean. For that it should have enough buoyancy to carry the GRP-plant and it should have enough mechanical strength to transmit wave energy through its rocking to the GRP-plant.

Every floating mean can be provisionally or not provisionally considered as a ship. A ship presents the most common case of floating means.

Ship trim against waves is a reason of ship pitching or rolling with force moment applied to the gyroscope through the converter if it has loaded. The converter is transforming the slow rocking process to the fast one way output shaft rotation. The gyro fulcrum hinders free ship rocking through the loaded converter and causes trim increasing. The more loaded converter the gyroscope as its reaction creates the more reactive fulcrum torque. And the faster gyro precession is happening. Fortunately the rocking process is happening periodically to both side. So the gyro precession goes to both sides also and the mean gyro axis can be stable enough time.

And this is the basic prerequisite for successful solution the general problem 'using gyroscope as the fulcrum support for converting the ship rocking motion to customary power'. But the fortune is not expanding in time. Many reasons are existing to drift the GAM-line from the plumb. The most significant is the Earth revolution.

Totally we need to solve the next basic problems in order to reach our purpose:

1. Developing the mechanical structures converting the ship rocking to customary power.
2. Creating the method for analysis a gyroscope and a rocking ship force interaction.
3. Searching and developing the basic schema and devices to control effectively the gyro precession in order to rush the GAM-line to the plumb.
4. Creating architectures for the ship using the GRP-station for powering and propulsion.
5. Developing the automatically controlled force moment generator.
6. Developing the floating power plant energized by the heaving process.

To get more sea energy we should weaken other reasons able to retard the rock process. These are pitch moment inertia, a joined water mass inertia and a resistance of water and air friction. If the ship body is madden light and with streamline low heavy keel as floating pendulum then the greatest part of retarding reasons disappears because it is rocking and copies seas process almost without its trim. After this we can consider the only one resistance reason. This is resistance of the GRP-plant mechanism loaded by the power consumers.

BRIEF SUMMARY OF SEVERAL VIEWS OF DRAWING

FIG. 1. GRP-plant (general appearance: A- front view; B- top view where the right converter is substituted with a support; C- section AA from the front view).

FIG. 2. Converter of rocking motion to uniform revolution (front right or rear left flank views: A-converter of the angle oscillations to uniform shaft revolution; B- speeds up gearbox).

FIG. 3. Rocking energized floating power plant supported with gyroscope (there are shown two drive gear quadrants and a gravity mechanism for gyro precession control in polar coordinates).

Figure 4B:
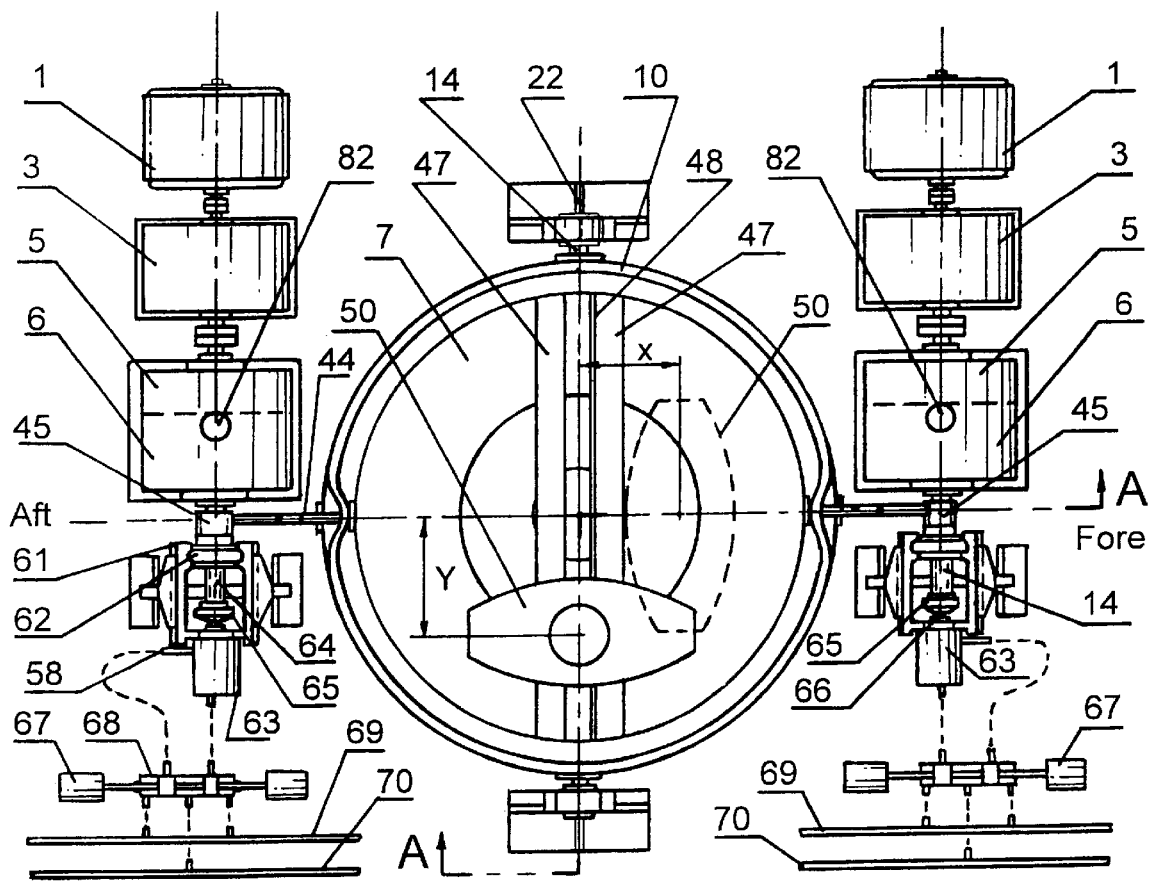

FIG. 4. Compact assembled rocking energized floating power plant having two drive gear quadrants and gravity mechanism for gyroscope precession control in rectangular coordinates (A- right side view, section AA from the top view B containing also a chart of clutch mechanisms).

Figure 5:
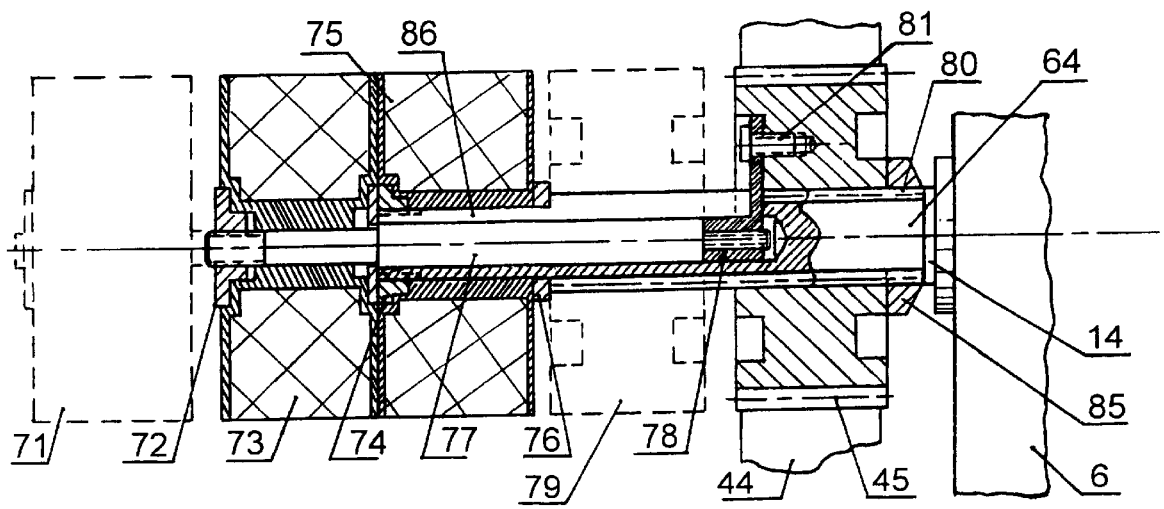

FIG. 5. Shaft mounted clutch mechanism providing disengagement of the gyro from the converter.

Figure 6A:
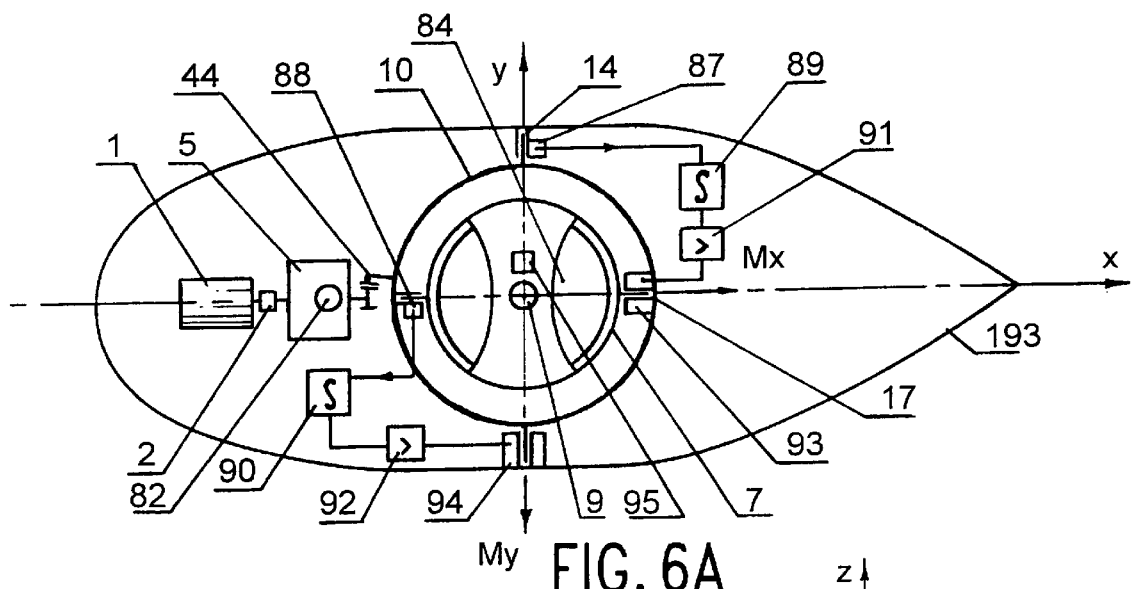
Figure 6B:
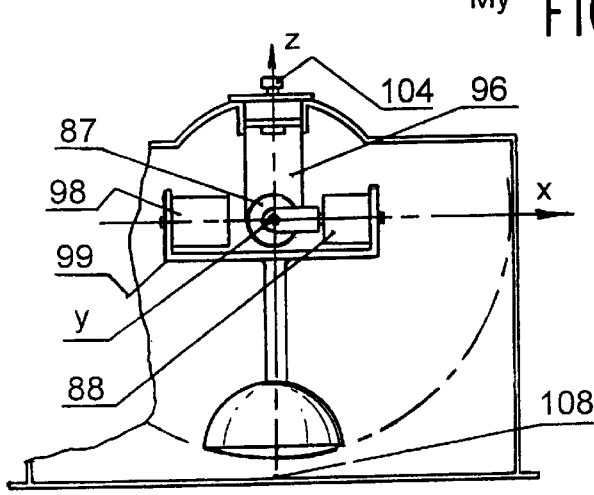

FIG. 6. Gyro precession control system chart (A) and gyro attitude sensor of pendulum type (B, C).

FIG. 7. Pictures explaining gyro attitude measurement (A, B) and inter relation between gyro attitude parameters measured in rectangular and polar coordinates (C, D).

FIG. 8. Reducing gyro axis inclination by ship left turn (A) and increasing it by ship right turn (B).

Figure 9A:
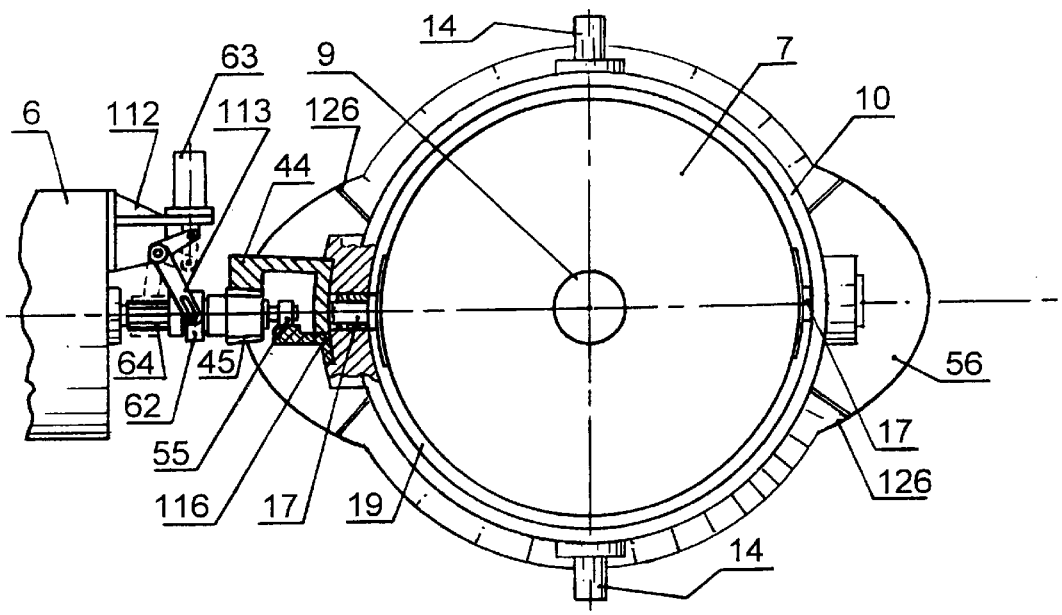
Figure 9B:
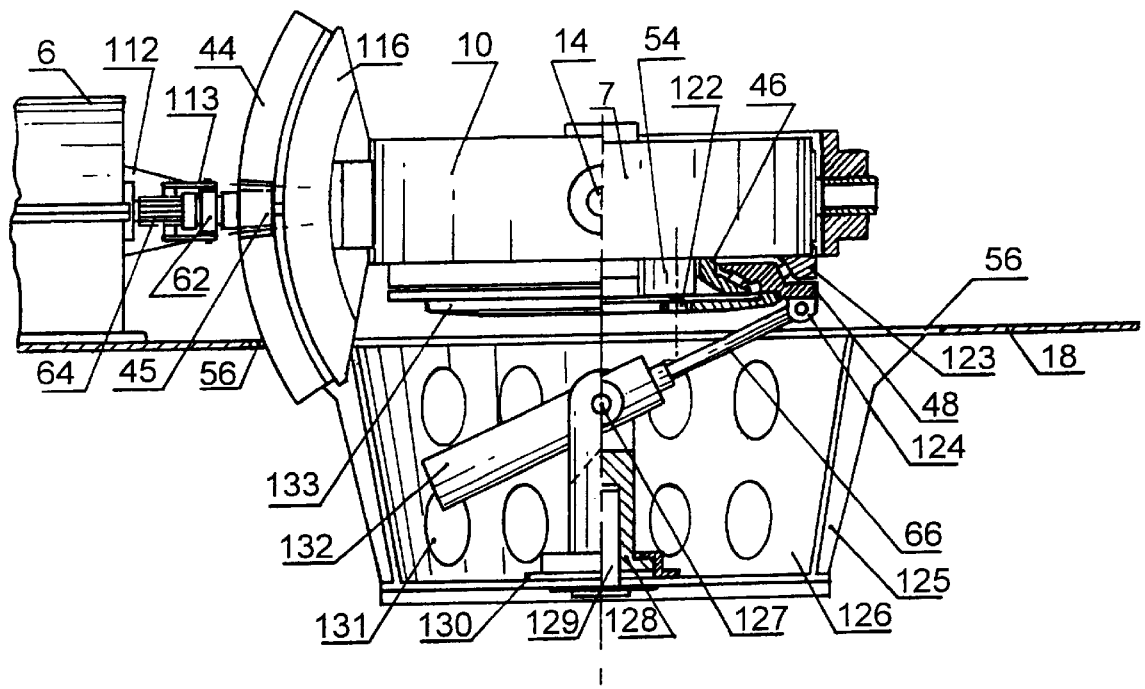

FIG. 9. Long wise assembled GRP-plant (A) with precession control system creating gyro restoring force moment in any required direction (B).

Figure 10A:
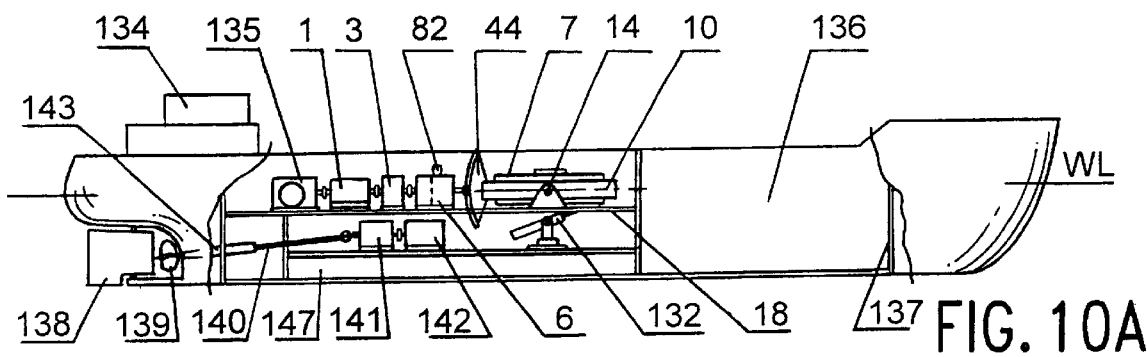
Figure 10B:
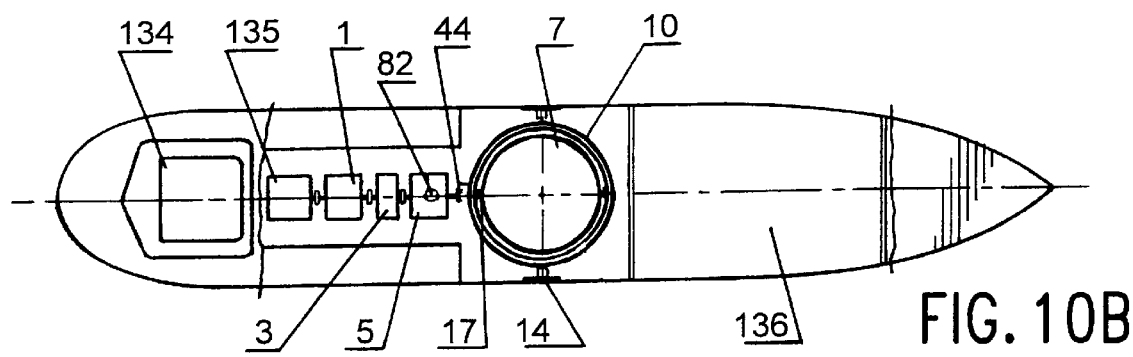

FIG. 10. A ship powered by GRP-plant (A, B- right and top ship views with a gyroscope on middle).

Figure 11A:
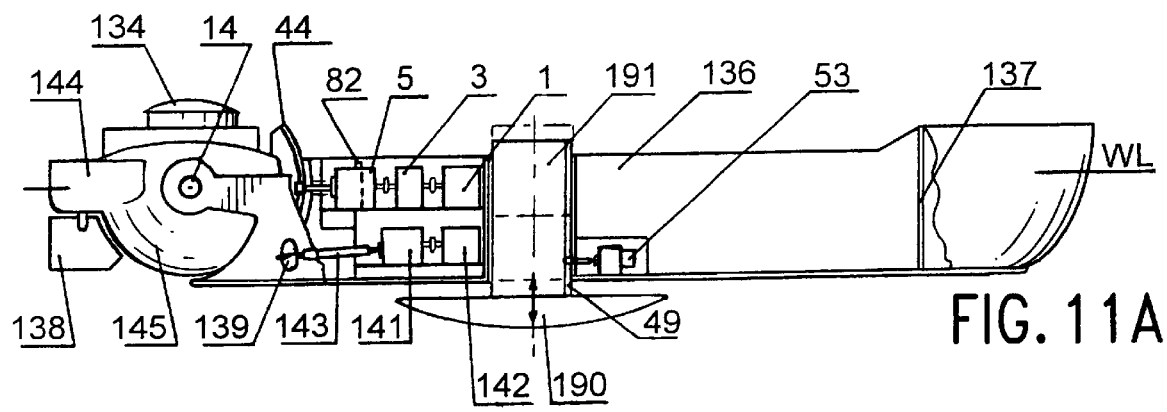
Figure 11B:
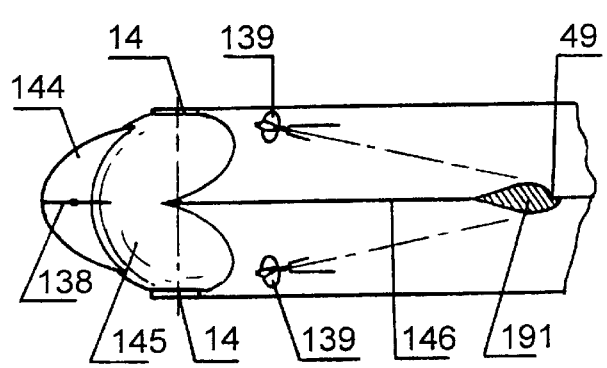
Figure 11C:
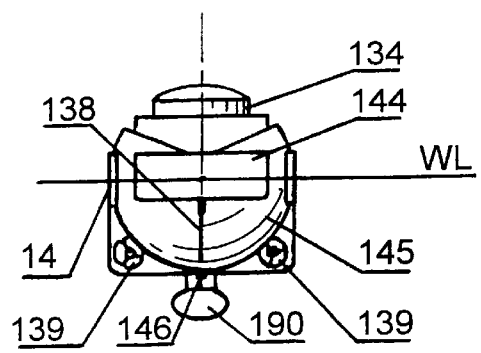

FIG. 11. A ship with the GRP-plant located in the stern (A, B, C- right side, bottom and rear views).

Figure 12A:
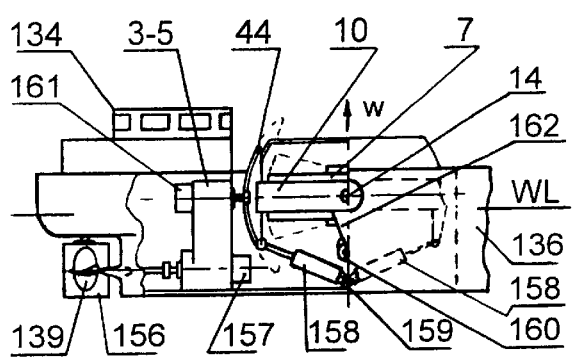
Figure 12B:
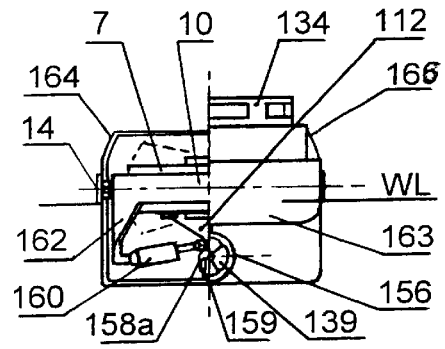

FIG. 12. A ship with a hydra pressure power station supplying ship services including propulsion (A- right side view and B- rear ship half-sectional view).

FIG. 13. Gyro precession control systems (A- using the swerve hydra cylinder: see FIG. 10; B- using four hydra cylinders providing also pressure energy deriving: see FIG. 12):

FIG. 14. Rocking propelled ship with an active rocking propulsor (A- chart of action, B- forces chart).

FIG. 15. Signs and explanation for gyroscope behavior.

FIG. 16. Retracting under the bottom wagging propulsor with stabilized foil support (A- rear view of section BB from the B; B- right view of section AA from A without the axle cover).

FIG. 17. Adjusted and controlled spring force moment generator (A- front section, B- half side views).

FIG. 18. A floating power plant energized by the heaving and supported by submerged inertia body.

| LIST OF NUMBER SIGNS. | | | | |
|---|---|---|---|---|
| tens | | units | | |
| 0-converter, | 1-generator, | 2-coupling, | 3-step-up gear, | 4-coupling, |
| 5-spin rectifier, | 6-speed-up gear, | 7-gyroscope, | 8-gyro spin axis, | 9-speed up drive, |
| 10-gimbal, | 1-foot, | 2-input shaft, | 3-output shaft, | 4-rocking shaft, |
| _5-shaft nest, | 6-bearing, | 7-fore-aft axle, | 8-base plate, | 9-clearance, |
| 20-input shaft, | 1-output shaft, | 2-support, | 3-shaft lock, | 4-bearing, |
| _5-carrier, | 6-satellite gear, | 7-satellite gear, | 8-bevel gear, | 9-cylinder, |
| 30-bevel gear, | 1-twist spring, | 2-bevel pinion, | 3-overrun clutch, | 4-main shaft, |

-continued

LIST OF NUMBER SIGNS.

| tens | | units | | |
|---|---|---|---|---|
| _5-one way dram, | 6-bevel gear, | 7-overrun clutch, | 8-bearing spider, | 9-internal gear, |
| 40-internal gear, | 1-sun gear, | 2-brake gear, | 3-bearing, | 4-gear quadrant, |
| _5-driven gear, | 6-ring suspension, | 7-guide, | 8-gear rack, | 9-swivel carriage, |
| 50-weight, | 1-slider, | 2-liner drive, | 3-pinion, | 4-round drive, |
| _5-roll, | 6-opening, | 7-support, | 8-pipe union, | 9-guide slide, |
| 60-brake, | 1-clutch frame, | 2-bush member, | 3-cylinder, | 4-splined shaft, |
| _5-stock mount, | 6-stock, | 7-electromagnet, | 8-control valve, | 9-high pressure, |
| 70-low pressure, | 1-far position, | 2-nut, | 3-electromagnet, | 4-nut, |
| _5-electromagnet, | 6-thrust washer, | 7-tie-rod, | 8-draw nut, | 9-gear off-position, |
| 80-spline, | 1-screw, | 2-brake, | 3-board, | 4-gyro rotor, |
| _5-rest, | 6-guide groove, | 7-angle sensor, | 8-angle sensor, | 9-integrator, |
| 90-integrator, | 1-amplifier, | 2-amplifier, | 3-moment drive, | 4-moment drive, |
| _5-gravity sensor, | 6-suspension, | 7-key, | 8-counter weight, | 9-pendulum, |
| 100-cylinder, | 1-slip rings, | 2-stator, | 3-rings assembly, | 4-socket, |
| _5-synchro, | 6-rotor, | 7-angle sensor, | 8-null-point, | 9-vertical, |
| 110-spin direction, | 1-cross track, | 2-cantilever, | 3-bell-crank, | 4-stop, |
| _5-bob, | 6-balance, | 7-rest, | 8-opened flap, | 9-opened flap, |
| 120-winch, | 1-frame guide, | 2-pinion, | 3-roller bearing, | 4-hinge, |
| _5-stiffening rib, | 6-stand, | 7-pin, | 8-column, | 9-pin, |
| 130-mounting, | 1-hole, | 2-cylinder, | 3-internal gear, | 4-deck house, |
| _5-engine, | 6-cargo hold, | 7-partition, | 8-rudder, | 9-propeller, |
| 140-shaft, | 1-gearbox, | 2-motor, | 3-deadwood, | 4-rudder house, |
| _5-gyro-ball, | 6-keel, | 7-battery hold, | 8-slot, | 9-slot, |
| 150-keel guides, | 1-rocker guide, | 2-pulley, | 3-foil axle, | 4-rudder stock, |
| _5-foil base rib, | 6-nozzle, | 7-hydraulic drive, | 8-cylinder, | 9-hinge stop, |
| 160-cylinder, | 1-clutch, | 2-cantilever, | 3-machine room, | 4-left space, |
| _5-piston, | 6-right space, | 7-stock, | 8-control valve, | 9-control valve, |
| 170-low pressure, | 1-high pressure, | 2-extra high pre. | 3-control valve, | 4 spring-ball valve, |
| _5-spring-ball v. | 6-spring-ball v. | 7-spring-ball v. | 8-rest lever, | 9-bearing, |
| 180-rope, | 1-ledge, | 2-shaft-pulley, | 3-spindle, | 4-propulsor arm, |
| _5-bifoil, | 6-wave line, | 7-axle, | 8-corbel, | 9-pin, |
| 190-bob, | 1-vertical keel, | 2-opposite wave | 3-hull, | 4-pitch center; |
| _5-pin, | 6-pin, | 7-pin, | 8-slide frame, | 9-sliding bush, |
| 200-rocker, | 1-spring, | 2-spring, | 3-corbel, | 4-corbel, |
| _5-bottom, | 6-tie-tube, | 7-splined bush, | 8-gear, | 9-roller, |
| 210-splined bush, | 1-case, | 2-cover, | 3-frame, | 4-cog, |
| _5-cog, | 6-cog, | 7-cog, | 8-spring, | 9-splined bush, |
| 220-inner dram, | 1-beacon, | 2-bridge, | 3-ladder, | 4-port-light, |
| _5-floor, | 6-platform, | 7-sealing hose, | 8-sealing, | 9-anchor rope, |
| 230-lifting ring, | 1-hollow ball, | 2-hole, | 3-closed flap, | 4-closed flap, |
| _5-closed flap, | 6-opened flap, | 7-leg, | 8-heavy base, | 9-axle. |

LIST OF SIGNS AND ABRIVATIONS a—prefix of allowable parameter; ^, /, x, √( )—power, division, multiplication, square root signs; x,y,z—axis': longitudinal, transverse, vertical; X,Y—shift size for upper and lower weights; ∫—integrating function; >—amplification; e—extreme highest point; ι—gyro inclination; ι'—mesured inclination; W—angular momentum vector; Ω—angular speed; O—pitch center; h—high of the extreme point; JOK—gyro disk plane; JK—highest line tangent to gyro disk; ιx, ιy—gyro inclinations to (x) and to (y) axis; α—extreme point course angle; P—precession, pitch;

Wxy—projection of vector W to horizontal plane; Wz—projection of W-vector to vertical axis; Mz—antiturn gyro force moment; QWL—quit WL; H—amplitude foil swing stroke; B—buoyancy; LL—support force centers line; N—normal foil drag force; R—propellant; G—ship gravity; Q—drag force vertical projection; b—vertical buoyancy projection; C—gravity center; J—moment of inertia; υ—specific material strength (maximum allowable tangent velocity for the circular loop gyroscope); PACS—precession automated control system; GAM—gyro axis mean (-drift, -line); GRP—gyroscope supported and rocking energized power (-plant).

DETAILED DESCRIPTION OF INVENTION

1. Developing the Mechanical Structures Converting the Ship Rocking to Customary Power.

1.1. Physical basis.

Each flank of the GRP-plant (FIG. 1a,c) consists of the generator 1, the step up gearbox 3, the converter 'angle oscillations to shaft revolution' 5-6. Its right flank (if presented) is the mirror reflection of the left flank with components indexed by 'a'. Between these there is the gyroscope 7. The GRP-station is mounted on base plate 18 transmitting pitch motion to all components except the gyroscope 7. The gyroscope 7 is mounted with its external frame 10 on the flattened shaft ends 14, 14a of the converters 6 and 6a. We explain working process using the left flank.

When the ship is rocking the converter 6 its input shaft 14 is kept immobile by the still frame 10 of the gyroscope 7 with the flattened end. Thus the shaft 14 and the converter case 6 oscillate relatively each other. The converter 5-6 transforms oscillations of the input shaft 14 to one way revolutions of the output shaft 21. Then the step up gearbox 3 accelerates this revolution and drives the generator 1 producing electric current. Functions of other parts are cleared by the FIG. 1a, c. The single flank GRP-plant is shown on FIG. 1b.

Now the ship can not freely pitch following to seas. Only its raised trim can pitch the ship further. Overcoming reactive force moment from the converter case 5-6 the pitching ship body performs useful work (powering the GRP-plant or ship propulsion). The greater generated power the greater trim is needed to pitch the ship. The rocking angle stroke range is reduced when the trim raises. There exists the gold middle of load: the trim should not exceed half of seas slope.

1.2. Two Stage Conversion 'Ship Rocking to Fast Uniform Shaft Revolution'.

The converter 5-6 function is very important because the generator 1 revolution with speed 55 rpm in every 3–5 minutes can not be redirected. Redirection will take all rocking energy owe to inertia of revolving mass. So fast parts of the converter and the generator must be revolved uniformly. For that speeding gearbox part is picked out and organized as the single gearbox 3 (FIG. 1) and its rear view is shown in detail on FIG. 2b. The chart (FIG. 2b) and formula were borrowed from [1, page 216] as convenient for our usage: the small gabarits with the efficiency for speed up function. Transmission ratio for this separated speed up gearbox is defined as:

$$U = \omega 41/\omega 40 = (1 + z39/z41)/(1 - z39 \times z26/z27 \times z40),$$

where: ωN—angular speed of the gear wheel number N as shown on FIG. 2b;

zN—number of teeth on the gear wheel number N as shown on FIG. 2b.

The converter 5-6 consists of two aggregates (FIG. 2A). The first one is the speed up gear stage 6 having the same chart as the last gear stage (FIG. 2b). It has less speed and much more gabarites to keep giant forces and moments. Nevertheless it is pictured in the same size in order to explain the basic ideas. The rotary or angle oscillations of the input shaft 14 revolves the female gear 40 which is engaged with gear 26 of planet rigid couple having the second gear 27 engaged with still female gear 39. The different wheel diameters impacts speed up revolution of the carrier 25 and said planet wheels. As a result the sun gear 41 transmits much greater angle oscillation to the connecting shaft 34.

The second aggregate is the angle oscillation rectifier 5 converting angle oscillation of the input shaft 34 to the output shaft 21 uniform revolution. For that the shaft 34 rotary oscillates the bevel gear 32 and rotates the dram 35 to single direction through the overrun clutch 33. In own turn the bevel gear 32 oscillates the bevel gears 30 and 36 supported by the still tube bearing 38. Both of them transmit rotation to the bevel gear 28 connected via the overrun clutch 37 to said dram 35. When the shaft 34 revolves the dram 35 to right direction the bevel gear 28 rotates to the back direction in which the overrun clutch 37 does no impact. When the shaft 34 revolves in the back direction it revolves the dram 35 again in the right direction but through the bevel gear 28 which now impacts on the dram 35 through the overrun clutch 37.

So any shaft 34 motion (right or back) swirls the spring 31 through the dram 35. And this spring uniformly transmits one way revolution to the output shaft 21 through the outer dram 29. This revolution is speeded up by the gearbox 3 and is transmitted to the electric generator 1.

2. Method for Analysis Force Interaction of a Rocking Ship and a Gyroscope.

2.1. Consideration of Basic Principles.

According the definition [2] a gyroscope should have the very high angular speed Ω about the main gyro axis and the great moment of inertia J so that the gyroscope angular momentum should be great as possible:

$$W = J \times \Omega \tag{1}$$

The principal theorem of the gyroscope expresses the interaction between a force moment M applied to the gyroscope to tilt it and its real movement (precession). If a force moment M acts on the gyroscope (FIG. 15) about an axis perpendicular to the main gyro axis then the gyroscope with its angular momentum W rotates slowly with speed ω about the third axis. It is perpendicular to both called and its vector is directed to turn the main gyro axis (and so the angular momentum vector W and angle speed vector Ω) to the force moment vector M. The slowly rotation is called precession and calculated by formula:

$$\omega = M/W \tag{2}$$

Everywhere signed vectors are subjected to the right screw rule. It means the rotation is directed similar swirling a right screw to drive it as the vector shows. This theorem is the basic rule to control the gyro axis mean (GAM)-drift. As shown on the FIG. 15, it enough to redirect the moment M from x-axis to y-axis in order to change the precession from y-axis to x-axis. To turn precession back it is enough to turn back the moment M. Actually the gyroscope is loaded by the load force moment M produced by the converter 5-6 under the ship pitching process. And we need to apply to the gyroscope the special control force moment with its vector directed from the tip of the GAM-line to its central plumb. It is the basic rule for controlling the GAM-drift through the adding the plumb directed gyro precession.

One of the basic gyroscope parameter is its moment of mass inertia [3] defined as follows:

$$J = m \times \rho^{\wedge}2, \tag{3}$$

$$\rho^{\wedge} = \chi \times R^{\wedge}2, \tag{4}$$

where: ρ—gyration radius, χ—gyration coefficient (1—for circular hoop, 0.5—for disc), m—gyro mass, it calculated as follows:

$$m = d \times Q, \tag{5}$$

d—mass density,

Q—gyroscope volume.

We need to determine size of the gyroscope with torque fulcrum able to resists against to the pitching force moment. Accomplishing of formulas substituting 5→4→3→1 and result transforming we have got the formula to calculate the gyroscope fulcrum moment capacity:

$$M = \bar{\omega} \times d \times Q \times \chi \times V \times R. \tag{6}$$

Now if we have input parameters: allowable gyroscope mass m, allowable velocities $\bar{\omega}$, V and required fulcrum moment M, we can define the required gyroscope radius as follows:

$$R \geq M/(\chi \times V \times \bar{\omega} \times m). \tag{7}$$

2.2. Physical Limitations for the Tangent Linear Gyro Speed.

In conformity with [3] the stress in the rotation gyroscope is defined as follows:

$$\sigma = V^{\wedge}2 \times d/f, \tag{8}$$

where: V—tangent linear velocity, f—velocity factor (1—for circular hoop, 3—for disc).

If aσ—allowable stress (material strength) then we can calculate the allowable tangent linear disk velocity limit as follows:

$$aV = \sqrt{f \times \upsilon}, \tag{9}$$

where:

$$\upsilon=\sqrt{(a\sigma/d)},\tag{10}$$

υ—the maximum tangent velocity for circular loop gyroscope expressed as the squire root of the integrated material property, i.e. specific material strength $$ss=a\sigma/d.\tag{11}$$

The circle loop produced from the spring steel (d=7.8 mg/mm^3 and strength aσ=1 kN/mm^2, ss=128205 (m/sec)^2) allows the tangent velocity υ=√(ss)=358 m/sec.

2.3. The Allowable Gyroscope Precession Speed.

The total gyroscope inclination (climb) relatively the ship hull I is sum of

D—the maximum GAM-drift,

Θ—the maximum roll angle (amplitude),

P—the maximum precession angle (amplitude).

So the allowable angle of precession hesitation depends of how precisely (perfectly) the gyro precession automated control system (gyro-PACS) keeps the mean gyro axis upright, i.e. it depends of the controlled GAM-drift D. And also it depends of the roll angle amplitude Θ. The better is the gyro-PACS then the GAM-drift is smaller. The allowable gyro precession angle amplitude is calculated as follows:

$$aP=I-\Theta-D.\tag{12}$$

Now we can define the allowable precession angular speed:

$$\overline{\omega}=4\times aP/T,\tag{13}$$

where: T—pitching period of the ship pitching.

If aP=0.3 radian (17.2 degrees) and the pitching period T=6 sec then $\overline{\omega}$=0.2/sec.

2.4. Transmission Sea Energy to the GRP-plant Through Pitch Motion.

The reason of ship rocking is the gap between the buoyancy vector and the ship gravity center (FIG. 14B). If there is no resistance for the rocking process (pitch moment of inertia is absent or neglect small) then the ship trim induced by sea are small as well. The GRP-plant transmits the gyroscope fulcrum moment back to the ship body 193 (FIG. 6a) as the GRP-plant reaction. The greater load the bigger trim should be done by a sea in order to overcome the load resistance. The ship trim Δ is the difference in draught between the bow and stern. It is measured in centimeters (cm). There exists the formula to calculate the specific moment to trim Δ=1 centimeter [5]:

$$\mu=G\times A/(100\times L),\tag{14}$$

where: G—the ship weight,

A—longitudinal metacentre height (altitude),

L—ship length on waterline.

If the trim is measured with angle δ (radians) between static QWL and trimmed WL then the trim Δ can be calculated as follows [5]:

$$\Delta=\delta\times L\times 100.\tag{15}$$

If the trim Δ is known then the sea work force moment applied to the ship is defined as follows:

$$M=\mu\times\Delta.\tag{16}$$

To make clear our reasoning we suppose the best ideal variant for transmission waves energy to the ship and thus to the GRP-plant when the only work load resists against sea action. In this ideal case the waving will pitch the ship with the constant moment and trim. So the work load level causes its corresponding trim. Let's to assume the wave period T=6 sec then the average wave height h=2.5 m and its length λ=56 m are accepted from the handbook [4]. It also helps us to calculate a mean peak wave slope α=0.14 radians (it is 8 degrees) with the formula:

$$\alpha=3.14\times h/\lambda.\tag{17}$$

Let's assume the load resistance of the GRP-plaint causes the trim δ=0.02 radian. Because the ship pitching motion lags behind wave sloping a with the trim δ then between each contiguous peak slopes (half wave) the size of pitch angle motion is defined as ϕ=2×(α−δ). And whole pitch stroke for single wave has the size:

$$\phi=4\times(\alpha-\delta)\tag{18}$$

For our example the slope of a single wave accomplishes angle motion 4·α=0.56 radians during its period but the ship pitching stroke is only ϕ=0.48 radians. The greater work load moment M the less work stroke ϕ is accepted by the GRP-plant. The derived power arises while δ<α/2.

The power produced by the GRP-plant using seas motion can be calculated with formula:

$$\wp=\xi\times M\times\phi/T,\tag{19}$$

where: ξ—the GRP-plant efficiency coefficient.

If the longitudinal metacentre altitude A=41 m, the ship weight=2304 kN and the length L=35 m, then the use formula (11) gives the specific moment sought μ=27 kN·m/cm. When δ=0.02 radian then Δ=7 cm and the load moment M=189 kN·m. Now the potential power (t=1) is calculated with the formula (15) is ℘=15.12 kW. For comparison the trims Δ: 14, 21 cm correspond the moments M: 378, 567 kN·m, the pitch strokes ϕ: 0.40, 0.32 radian, and the powers ℘: 25.2, 30.24 kW.

2.5. Transmission of Heaving Energy to the GRP-plant by the Ship of the Pendulum Layout.

This effective way of energy transmission is possible if the ship has the pendulum layout (FIG. 14a,b) i.e. its gravity center is below the pitch center. The oscillations period of this 'ship-pendulum' is coincide with wave period and the heaving energy is transmitted to pitch process and it is added to the GRP-plant. Lets to evaluate it for our example. Every time when a wave raises our 'ship-pendulum' on own crest the ship accepts the gravity energy magnitude as:

$$E=G\times h.\tag{20}$$

And the ship body spends it with additional powering of pitching process during wave period. So the inducted pitching enables the 'ship-pendulum' to overcome the bigger resistance force moment of the GRP-plant. Disregarding of the energy losses we can evaluate additional the heaving power as:

$$\Psi=G\times h/T.\tag{21}$$

For our example Ψ=2304 kN×2.5 m/6 sec=960 kW.

So the total power accepted by the 'ship-pendulum' is sum of pitching and heaving energies:

$$\exists=\Psi+\wp.\tag{22}$$

The maximum evaluation of it for our example is ∃=960+30.24=990.24 kW. If to suppose the consumption coefficient ç=0.5 and efficiency coefficient ξ=0.4 then: the total energy usage η=0.5×0.4=0.2, the use power input is 495.12 kW and the use power output is 198 kW. It is enough to propel the ship fast as 10 knots in heavy sea. The force moment applied to the GRP-plant and provided by the gyroscope is defined by reversing the formula (19) and taking 4=0.5 into account:

$$M = \varsigma \times \exists \times T/\phi. \tag{23}$$

For our example this moment M=495.12 kW×6/0.56= 5.305×10^6 N·m. Here we have took φ=4·α because the 'ship-pendulum' continues to pitch and to follow to a wave even though the trim becomes less then Δ. Heaving energy is accumulated by the 'ship-pendulum' as kinetic in time of wave lowering causing it to continue swing far from the wave hollow to inflection point where a wave has the peak slope as well as the 'ship-pendulum' has the pick pitch angle.

2.6. The GRP-plant Basic Geometric and Motion Parameters.

Now all input parameters are ready to calculate the constructive GRP-plant parameters. In our example the ship width is β=5.64 m (the narrow ship), so the gyro disk radius can not be more then 2.5 m. Let's take the gyro radius R=2.4 m. Using the formula (7) and (9) we obtain $$m = M/(\overline{\omega} \times \chi \times \sqrt{f} \times \upsilon \times R) - \tag{24}$$

the gyroscope disk mass m=5.305×10^6/(0.2×0.5×1.732× 358×2.4)=35.65 Mg; the volume Q=4.57 m^3, and thickness H=0.2525 m, the weight 350 kN, the linear velocity V=620 m/sec, rotation speed Ω=258.3 radian/sec. The ratio circle hoop and some gyro masses is $$\gamma = \chi \times \sqrt{f}. \tag{25}$$

For hoop/disc γ=0.5×1.732=0.866. If we take the internal hoop radius 0.8×R^2=1.92 m then we obtain mass m=30.9 Mg, volume Q=3.96 m^3, weight 303 kN, the thickness H=0.61 m, linear speed μ=358 m/sec, rotation speed Ω=149.17 radian/sec. We see the circle hoop has not significant weight advantage. Everywhere here we did not take the safety factor into account.

2.7. Conclusions and Basic Layout Improvement.

Numerical calculations have shown that the GRP-plant mounted with the layout shown on the FIG. 1 can not accept the rocking energy fully because of the too small radius of gyro disk unable to create sufficient fulcrum moment. The second reason of it is the necessity to produce the oscillating shaft 14 (see FIG. 1) with a very great diameter. In reference to our example where the required fulcrum moment must be greater then 5.305×10^6 N·m that requires the single shafts 14 or 14a diameter can not be less 0.27 m.

In order to come nearer to practice the more acceptable layout to transmit the fulcrum moment is developed and given on the FIG. 3, 4 and 9. On the layout (FIG. 3) the shafts 14 and 14a do not transmit any moment. Instead of it the fulcrum is created by the toothed quadrant 44, 44a for gears 45, 45a of gearboxes 6 and 6a. When pitching they are revolving around the still toothed quadrants 44, 44a owe to the baseplate 18 pitched together with the ship. Now if the gear ratio is 20 then the required diameter of the input shafts 64, 64a carrying the gear wheels 45, 45a is only 0.1 m.

3. Searching and Developing the Basic Schema and Devices to Control Effectively the Gyro Precession in Order to Rush the GUM-line to Plumb.

3.1. The Easiest Scheme to Control the Gyro Precession.

The other reason why we need to limit the load for GRP-plant (additionally to p.1.1) is the gyroscope precession swings range increases when the growing load transmits back the greater moment to the gyro frame 10 through the input shaft 14 (FIG. 1). The gyro 7 trials the growing moment and equilibrates it by the own dynamic fulcrum reaction. And this is the reason why the gyro precession hesitating range becomes greater.

Also the important is to see the behavior of the GAM-line that must stay upright. To control its location the converter 5,6 is provided by the brake 82 (FIG. 1, 2, 4, 6a, 11). The brake 82 is periodically switched on accordance rocking rhythm to add the load for only one way angle oscillations of the shaft 14 (FIG. 1). The asymmetrical load force moment enforces the gyroscope to precess mainly to one side than the other. This predominate side (left or right) is depending from which way of the shaft 14 angle oscillations the brake 82 acts in. If it is applied in times when the ship is fore pitching then the gyro axis will additionally precess to the right side. If we need to shift it to the left side then the brake 82 must be applied in times of aft pitching. If the GAM-line follows to the plumb we use the brake 82 correctly. We assume here the gyro angular momentum W (FIG. 1) looks to up. Otherwise all movements and moments should be turned the opposite directions.

There are two disadvantages of the break method used as the single way of the gyro precession control. The first disadvantage is relating to the ship handiness. There is the necessity to turn the ship left in order to make fore or aft GAM-line tilts (drifts) to be the right or left side tilts before eliminating it. The second disadvantage of the break method is its disability when there is no rocking.

3.2. The Gravity Polar and Cartesian Schemes for the Gyroscope Precession Control.

The polar type gyroscope precession control (FIG. 3) includes the swivel carriage 49 revolving into the ring suspension 46 with rolls 55. The needed carriage 49 position is reached with the controlled drive 54 via the pinion 122 and the internal gear of the ring suspension 46. The issued carriage 49 position makes the arc shaped guide 47 transverse directed. Thus the gyro precession hesitations do not have influence on the weight 50. It remains in the lowest position on the guide 47 and gives it to hesitate freely because of the rolls 51.

When the GAM-line shifts left or right side then the carriage 49 should be set in the fore-aft position with the drive 122 as shown (FIG. 3). Then the weight 50 must be displaced aft or fore respectively with its bevel pinion 53 engaged with the bevel gear rack 48 cut on the guide 47 side. The weight shift is produced with the weight drive 52 through the pinion 53 engaged with the bevel gear rack 48. And the force moment produced by the shifted weight 50 directs where the gyro axis must follow.

The Cartesian gyroscope precession control system (FIG. 4) contains two shifted weights 50 (upper and lower) which can be moved separately along the transverse axis (y) with the shift Y and longitudinal ship axis (x) with the shift X in order to manage separately the mean gyro axis tilt drifts. The weights 50 are moved along the guides 47 with the drive 52 and its pinions 53 engaged with internal gear racks 49.

3.3. The Gyroscope Couplers Operating Description.

The couplers provide disconnection the gyroscope from the load in order to avoid its influence on the mean gyro axis alignment. The engaging and disengaging are accomplished (FIG. 4) with the identical couplers. For example, the aft coupler moves the gear 45 along the splined shaft 64 with the round sliding ring bush 62 being the part of the frame 61. This frame slides along the guide 59 (FIG. 4a) of the support 57 under the pressure in the cylinder 63.

When the cylinder 63 pushes its stock 66 (shown the only 66a) it disengages the gear 45 with the toothed quadrant 44 by moving itself aside from the around sliding end mount 65. Engaging is accomplished by the valve 68 controlled by electromagnets 67. It connect the high pressure hydraulic pipe 69 with the side pipe union 58 and the low pressure hydraulic pipe 70—with the bottom union 58. As a result the cylinder 63 pulls itself for the end mount 65, the frame 61, the bush 62 and the gear 45 toward the toothed quadrant 44 and engages them.

The other design of the gyroscope coupler (FIG. 5) uses the electromagnet 75 fixed on the splined shaft 64. The shaft 64 takes the torque from sliding gear 45a driven by the toothed quadrant 44a if the movable electromagnet 72 is pulled up to the electromagnet 75. The electromagnet 72 action pushes the gear 45a into the engaging by the stock 77 sliding into cylinder space of the splined shaft 64. If the electric current is changes direction then the electromagnets 72 and 75 are mutual repulsing and the stock 77 pulls out the gear 45a with the draw nut 78 and the screw 81 along the longitudinal groove 86. As result the gear 45a is disengaged from the quadrant 44a and the last one finishes to apply the force moment to the gyroscope 7.

The one more gyroscope coupler is shown on the FIG. 9. It contains additional element 55. It is the roll mounted on the splined shift 64 to compensate the side component of engagement force of the gear 45. And the gear 45 is disengaged by the cylinder 63 through the lever 113 and the round sliding bush 62.

3.4. The Automated Gyroscope Precession Control System (Gyro-PACS).

In accordance with the typical chart of the gyro-PACS (FIG. 6a) the system measurers the gyroscope inclination ($\iota x$) relatively the axis (x) with the angle sensor 87 mounted on the shaft 14 (the axis y). In order to reject interference proceeding from pitching the control loop has the integrator 89 renewing the summarized signal $\iota x$ from the angle sensor 87 during the some past period, amplifies it with the amplifier 91 and apply it to the moment generator 93. This one creates the force moment Mx around the axis (x). To reduce the gyroscope inclination mean value ($\iota x$) the moment vector Mx must point the positive direction of the angle ($\iota x$).

The similar control loop is organized to reduce the mean value of gyroscope inclination ($\iota y$) relatively the axis (y). It consists of the angle sensor 88, the integrator 90, the amplifier 92 and the moment generator 94. Here the integrator 90 rejects interference of rolling and the transverse precession hesitations. The angles ($\iota x$) and ($\iota y$) can be interpreted also as angles of The GAM-drifts from the plumb in the central lateral and transverse planes.

Figure 6C:
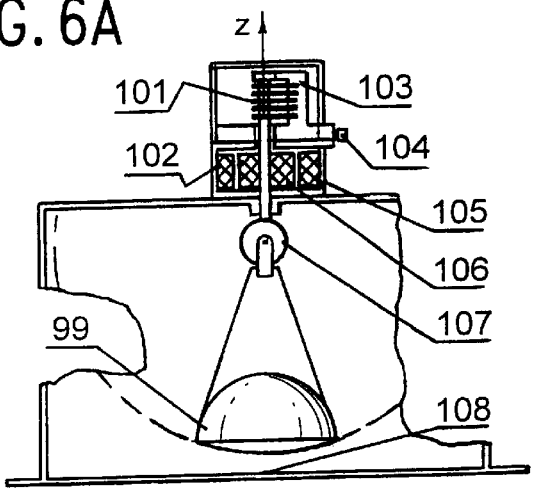

To reject rocking interference far the system can be equipped (FIG. 6a) with the mounted on the gyroscope pendulum angles meter 95 that can be two types: Cartesian (FIG. 6b) and polar (FIG. 6c). The similar sensors 87, 88 of the pendulum Cartesian angles meter (FIG. 6b) picks up correct signals $\iota x$ and $\iota y$. However to get the mean values of the gyro plane side inclinations ($\iota x$, $\iota y$) the system has to average them during the nearest some past period. This is because the work gyroscope hesitates under altering precession induced by the GRP-plant.

The pendulum polar angles meter (FIG. 6c, 7a,b) picks up the vertical gyro axis inclination ($\iota$) relatively the plumb with the sensor 107 and the course angle $\alpha$ relatively axis (x) with the sensor 105 (FIG. 6c). The mean values of them can be use to control gyroscope precession with the polar system (FIG. 3) or with the Cartesian system (FIG. 4) because measure results can be converted between both systems.

In fact the angular momentum vector W is deflected (FIG. 7) from the axis z on an angle ($\iota$), so the gyroscope plane crosses the coordinate planes along the 1l1, OJ and OK lines. The line JK is passed horizontal through the extreme disk point e located on the height h. The plane JLK is horizontal. So the vector W is in the plane OLeS. The course angle $\alpha$ is the second angle measured by the polar system. The desired angles ($\iota x$) and, ($\iota y$) can be calculated by the formulas:

$$\iota x = h/(y) = h(l/\cos \alpha) = tg\iota x \cos \alpha, \quad (26)$$

$$\iota y = h/(x) = h(l/\sin \alpha) = tg\iota x \sin \alpha. \quad (27)$$

Figure 7A:
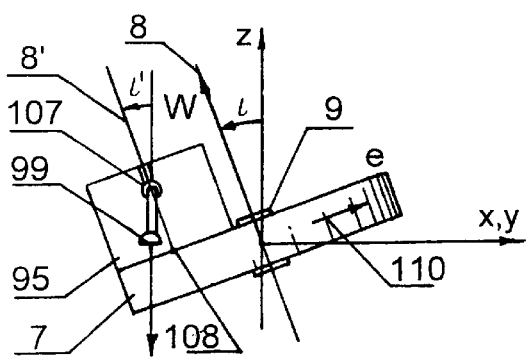
Figure 7C:
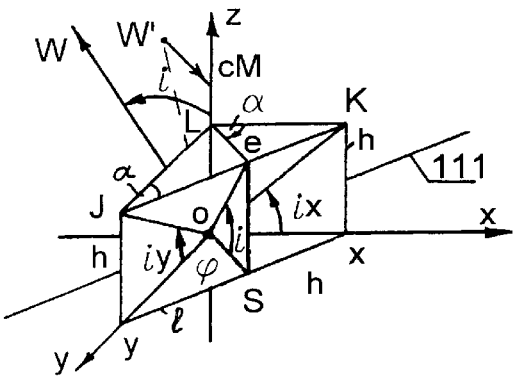
Figure 7B:
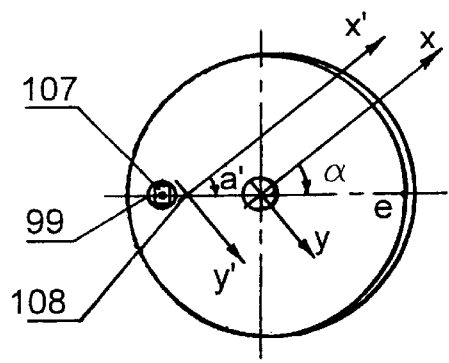
Figure 7D:
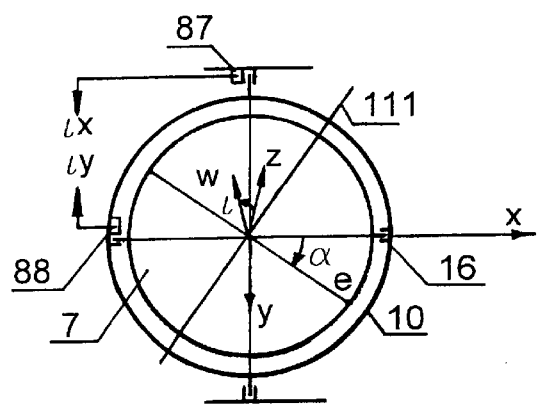

The FIG. 7d shows the usage opposite conversion when we want to get the polar angles from rectangular Cartesian measured angles. For that we should use the formulas:

$$tg\alpha = tg\iota y / tg\iota x, \quad (28)$$

$$\sin \iota = h/l = tg\iota x \cos \alpha. \quad (29)$$

3.5 Efficacy of the Gravity Force Moment Generators and Developing its Hydraulic Design.

The force moment generator 93, 94 (FIG. 6a) presents the generators of gravity type: polar (FIG. 3) and Cartesian (FIG. 4). Have they enough capacity to manage the gyro axis precession? The control force moment cM created by the weight 50 is defined as follows:

$$cM = wG \times l, \quad (30)$$

where: wG—weight gravity, l—horizontal displacement of the weight 50 from the vertical axis z.

If the weight gravity wG=35 kN and l=2 m then cM=70 kN·m. For our example the gyro disk has the rotation speed $\Omega$=258.3 radian/sec, the gyro disk mass m=35.65 Mg, $\rho^2$= 2.88 m^2, the moment of inertia J=102.7×10^6 kg·m^2, the angular momentum (formula 1) W=26.53×10^9 N·m·sec. And the gyroscope precession speed under this force moment calculated with the formula 2: $\omega$=cM/W=7×10^4/ 26.53×10^9 2.64/10^6 radian/sec. It means that during one hour the gyro precession is 0.0095 radian (or 0.545° per hour). This is too slowly. Earth revolves 27.5 times faster (15° per hour).

We need to generate the control moment cM in 50–100 times greater, for example cM≧4 MN·m. Let's to try the hydraulic pressure-system (FIG. 9) to operate the GAM-drift. If the force arm is the same l=2.5 m (FIG. 9b) then the force created by the hydraulic cylinder 132 must be at least F=1.6 MN. The cylinder of diameter 0.5 m requires the pressure 1.57 MPa or 16 atm to manage the gyro precession properly. To reduce this-pressure or cylinder diameter we can use two cylinders 132 mounted symmetric and opposite on the same shaft 127 of the column 128 (FIG. 9b) and generating the couples of opposite forces applied to the gyroscope 7.

The advantage of this scheme is its elasticity providing for the force moment constancy independently of the gyroscope hesitation and the ship rocking.

4. Creating Architectures for the Ship Using the GRP-station for Powering and Propulsion.

4.1. The Ship With the Gyroscope Located in the Middle.

Here (FIG. 10) the GRP-plant contains all elements presented on the FIG. 9. And it contains also the standard engine 135 able to drive the generator 1 when the gyroscope 7 is switched off with the clutch 63 (FIG. 9). The unit contains also the battery hold 147 (electric energy accumulation), the motor 142 and the reductor 141, the propeller 139 and its shaft 140. When the rocking is absent or it is not enough the ordinary engine 135 can power the ship propulsion and services. In other case the GRP-plant does it, and the batteries 147 accumulate superfluous energy.

The other example of the ship with the GRP (FIG. 11) contains the floating gyroscope ball 145 fixed to the ship hull with axles 14, 14a. The gyro ball provides the fulcrum moment relatively this axis stabilizing the gear quadrant 44a. The gyroscope 7 is suspended on the inner axis 17–17a (FIG. 9) and the gyroscope 7 hesitates around this axis owing to precession when it keeps steady gear quadrant 44a against the load moment of the GRP. This ship architecture provides more space for the cargo-hold 136. And secondly it lets to detach the gyro ball from the hull for quick exchange.

Also the second project is equipped with the heavy vertical telescopic keel 191 providing for the ship pendulum capability. As explained before it obtains heaving motion energy and transforms it to the pitching energy utilized by GRP-plant. The single condition of it is the equivalence (or a little access) of the free ship pitching period to the seas period. To equalize the free ship pitching period (ship-pendulum period) to the wave period the heavy vertical keel rigged with bob 115 (FIG. 11) can be, lowered or lifted with its rack 49 by the drive 53.

4.2. The Floating GRP-plant With the Hydraulic Converter of Rocking Motion to the Power.

Earlier we have scrutinized the floating GRP-plant with the mechanical converter of rocking energy to the power. The hydraulic converter also can be used for power production and ship propulsion separately or together with the mechanical one (FIG. 12). The mechanical converter 3-5 can take energy from the quadrant 44 if it is clutched. In this case the cylinders 158, 158a of the central lateral plane and the cylinders 160, 160a of the transverse plane should also work as the moment generators under the gyro-PACS control as described in the paragraph 3.4.

Figure 8A:
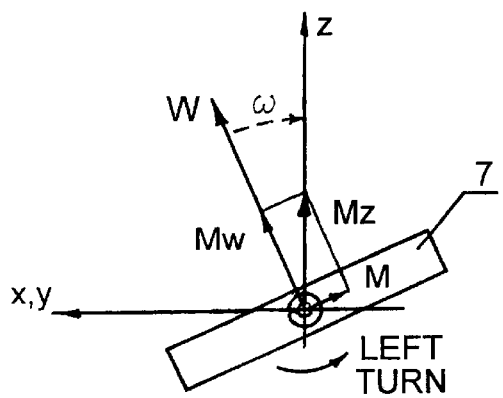
Figure 8B:
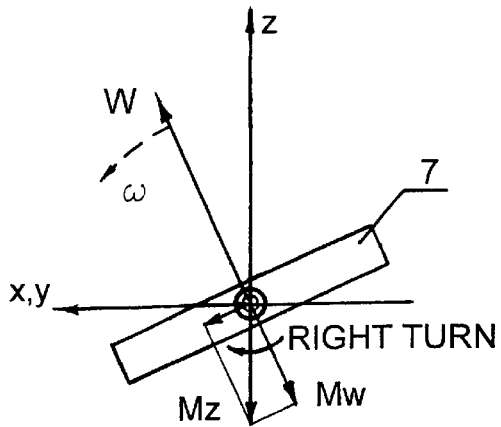
Figure 13A:
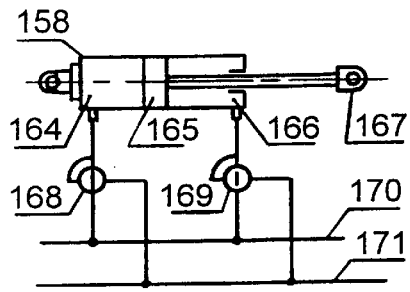

In this case each cylinder can operate by it through the hydraulic monitor (FIG. 13a). If the valves 168, 169 are both set vertical as shown or horizontal then both cylinder spaces are connected by the single pipe between the valves. Thus the piston 165 can freely move inside the cylinder without any resistance. If the valves 168, 169 is set different then the spaces have the different pressure because the valves connect them with the lines 170 and 171 of high and low pressures. To change direction of the force moment created by the single cylinder it is enough to set the valves 168, 169 to opposite state. Each cylinder can accomplish the stop function in order to arrest the gyroscope. For that both valves 168, 169 have to be set into third cut off state. /* Notice: The gyroscope arresting can hamper ship maneuvering (FIG. 8). When the inclined gyroscope disk 7 arrested then the ship can pivot only left turn because (FIG. 8a) it induces the force moment Mz applied to the gyroscope 7. Its component M perpendicular to the angular momentum vector W forces the disk 7 to precess safely to plumb. The moment M is a projection of the left turn ship moment Mz on the gyroscope plane; the other projection Mw has no influence on the gyroscope 7 because it is directed along the angular momentum vector W.

The ship can't do any right turn if the mean gyro axis stays not up right (FIG. 8b) because in this case the moment M applied to the disk 7 is directed to the other side. And causes the angular momentum vector W to precess from the axis z. So the gyroscope 7 increases its inclination. And the most interesting is the ship can not do the right turn until the gyroscope axis turns down. */

Figure 13B:
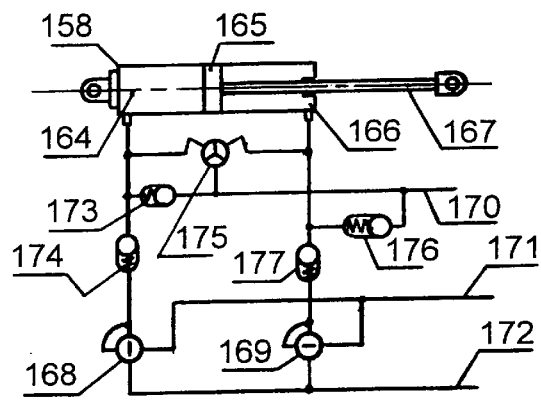

If the mechanical converter 3-5 is disengaged from the gear quadrant 44 with the clutch 161 (FIG. 12a) then the only hydraulic converter can produce the power by the scheme (FIG. 13b). For that the cylinders should be connected with the hydraulic power system by closing the valve 175 as shown for single cylinder 158 (FIG. 13b). The cylinders 158 and 158a (FIG. 12) in this case should work as the pumps (FIG. 13b) filing the high pressure tank (line 171) or extra high pressure tank (line 172) of the hydraulic power system with oil when the ship is rocked by the seas. In this case the gyro-PACS should differentiate the load for both directions of each cylinder using valves 168, 169 (FIG. 13b).

We see if the valve 175 is set as shown (cut off) then through the valves 173, 176 the oil is suck in from the line 170 (low pressure) by the space 164 or 166 depending of the direction the piston 165 is moved on. Both valves close the access of the high pressed oil into the line 170. The high pressure is created by the piston 165 in the space 164 or 166 where it is moving to. The piston 165 pushes the oil out of both spaces (in turn) through the valves 174, 177 into the line 171 (high pressure) or the line 172 (extra high pressure) depending of which directions the valves 168, 169 are set on. These are defined by the gyro-PACS depending of which the piston 165 motion must have additional resistance accordance the control rule: the control force moment vector cM must follow from the GAM-line W' to the plumb (FIG. 7c).

This scheme of the GPR-plant with few cylinders (FIG. 12) can produce the power from the pitching, heaving (if the ship has the pendulum layout) and also from the rolling. The cylinders 160, 160a can be loaded if there is rolling. For that the cylinders 160, 160a are mounted by face on the cantilevers 162 and 162a and by stocks on the cantilever 112 (FIG. 12b) of the gyroscope 7 bottom.

4.3. The Rocking Ship Propulsion Supported by the Gyroscope.

The Ser. No. 09/323,857 offers the rocking ship propulsion using the long rocking keel propulsor. It consisting of two opposite longitudinally projected arms keeping under water flapping hydrofoils producing the propellant when the ship is rocking. To provide high speed of foil swings the arms are madden as long as possible. The gyroscope gives the new possibility to increase the foil vertical swings under the rocking motion.

Figure 14A:
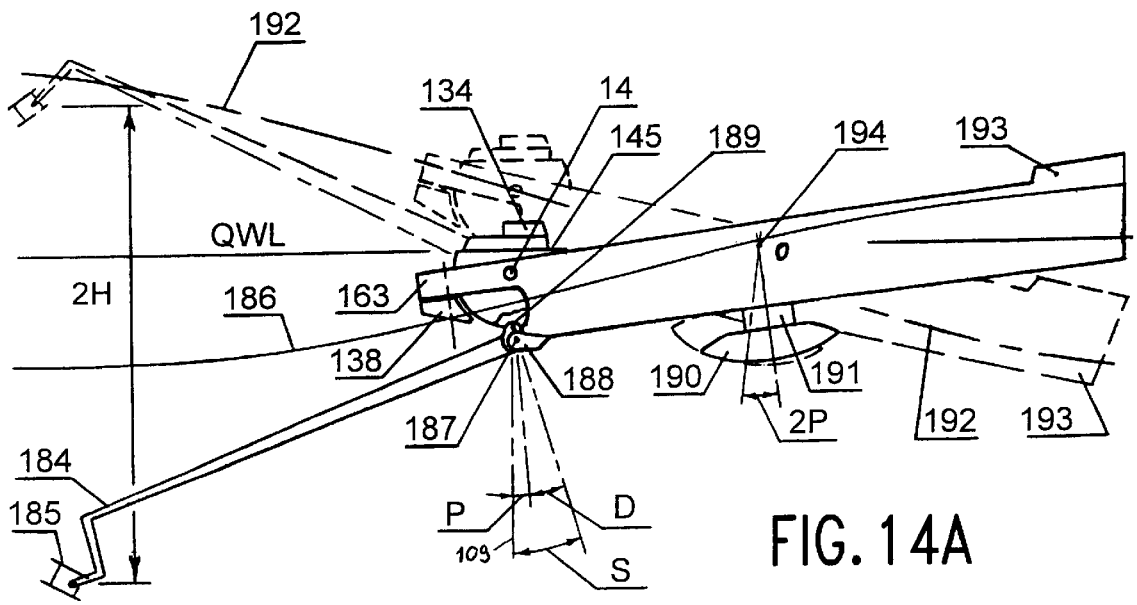

Let see the rocking propelled ship, supported by the gyroscope (FIG. 14a). When the sea 186 pitches the ship hull 193 on the pitch angle P as shown the gyro ball 145 rests vertical. As a result the line joining axis' 189 on the ball and 187 on the corbel 188 inclines together with the arm 184 on the angle S that exceeds the pitch angle on D=S–P as shown. Thus the foil 185 has the stroke much more than it has if only the arm 184 was fixed on the ship bottom. It is also true for ship opposite pitching under wave 192. So the sum stroke 2H is great enough to develop fast vertical motion and to get the propellant of custom ship velocity.

Once again the vertical keel 191 with the heavy bob 115 imparts to the ship the pendulum property in order to convert heaving energy to pitching energy. Also the lowering of ship gravity center is need to provide the transverse ship stability (FIG. 16a). Roughly the ship can be descry under action of forces B—buoyancy, G—gravity and N—foil water drag. To save stability the gravity center C must be located lower the line LL connecting points, where projections Q and b are applied. And also the projection T (propellant) must be greater than R in order to impart the ship translation.

4.4. The Retracting Rocking Ship Propulsor Rigged With the Stabilized Rest for Foil Oscillation.

The gyroscope gives possibility to use rocking motion to swing a foil propulsor. The propulsor 184 (FIG. 14) has the amplified angle of oscillations S comparably with angle of ship pitching P. In order to get the great stroke 2H for the foil 185 producing the propellant T. But it must be provided (FIG. 16) without oscillating of the rest lever 178 in order to uniform conditions for the foil work. The foil 185 resists against deflection by pressure of water flow with the rest lever 178 and the spring 202. Always it must be deflected on similar angle depending of only its velocity. For that the rest lever 178 should save its angle attitude parallel to the ship bottom 205.

So even though the propulsor 184 oscillates with angle amplitude S the rest lever 178 must only pitch together with the ship on angle P. Satisfaction of this condition guarantees the effective propulsor work. Other wise the propulsor can not produce considerable propellant and even more it can give the negative propellant in extreme areas.

And the third requirement is the propulsor must have retracting capability providing the maneuverability in straitened circumstances (channels, bays, ports etc.). For that includes (FIG. 16) several parts. The pin 197 is mounted on and stabilized by the gyro ball 145. The rocker 200 is mounted on two corbels 203, 204 welded to the ship body 193. The sliding frame 198 and bush 199 connected are by the cylinder 160 and guides 121 to the rocker 200. Two cylinders 100 connect the rocker 200 and the corbels 203, 204 via two stops 114.

Before propulsor retracts the rocker should be aligned with the bottom guides 150. For that the remote automated control system enforces the cylinder 160 to lower down the sliding frame 198 together with the bush 199 and so disconnect the rocker from the gyro ball 145 (pin 197). Farther the cylinders 100 are switched on and align the rocker guides 151 with the bottom guides 150 spreading under the ship bottom 205 as the ship keel.

When the propulsor extends by the drive 53 then the cylinder 160 lifts up the frame 198 and the bush 199 (hinged with the pins 195, 196 and oriented vertically with the spring 201). The bush 199 catches the pin 197 to get the joint. Then the corbels 203, 204 and the stable pin 197 swing the rocker 200, the arm 184 and the foil 185 to propel the ship when it is pitching.

The swings of the rocker 200 inducted by the ship pitching are imparted to the arm 184 and it oscillates around the still shaft-pulley 182. This shaft is having slots for the ledges 181 (FIG. 16a) of both short shafts 183 kept also motionless by the corbels 203, 204 via the bushing keys 97. When the rocker 200 swings it transmits own motion to the arm 184 through the rocker guides 151 and the arm slots 148 engaged each other on both sides of the propulsor. In its turn the arm 184 wags the bifoil 185 able to oscillate at its end around axis 153 owe to the axle 153 the spring 202 and the lever 178. The last one is stabilized because the arm 184 can not turn the short shaft-pulley 182. It is remaining steady owe to its engagement with the steady shafts 183 via ledges 181. On the side section view of the propulsor (FIG. 16b) the cover 64 is taken off.

The motionless shaft-pulley 182 keeps the end pulley 152 also steady because both pulleys are hard toughed by the rope 180. When the arm 184 swings the pulley 152 then its lever 178 saves its angle attitude steady. Now the water stream from constant angle base deflects the bifoil 185, defined by the motionless lever 178. This design of the propulsor with the stabilized rest lever 178 sharply increases its efficacy because the water stream always deflects the foil 185 on the optimal angle measured ship bottom 205 (or lever 178) direction. The deflecting resistance of the bifoil must depend on the pitching power and it can be adjusted with the end screw of the spring 202 located inside space of the base rib 155.

The propulsor retraction is accomplished with the submerged drive 53 via the pinion 52 engaged with the arm rack 49. In time of such retraction the guide 151 of the rocker 200 and the keel guides 150 should be aligned. This is because the groves 148 of the propulsor arm 184 and the grooves 149 of its internal shaft-pulley 182 must be moved smoothly along both of these guides. The cylinders 100 provide the alignment and the propulsor 184 can be retracted under the bottom 205 along the keel guides 150. Both of these are welded up to the bottom 205 in order to keep the propulsor 184 between them via both grooves 148.

5. The Automatically Controlled Force Moment Generator.

Earlier when we searched ways to control gyroscope precession in order to keep the GAM-drift from the plumb as small as possible we used the brake 82 (FIG. 1, 2, 4, 6, 11). The brake 82 creates the force moment added to the GRP-plant loading force moment but it is applied to the only transverse axis of the gyroscope 7. The way is chosen to apply the additional moment to the gyro in order to enforce it to precess additionally to the side that brings the GAM-line to the longitudinal vertical plane. The brake has two disadvantages:

Complicated control system designed to switch on the brake 82 only when the ship pitch applies the force moment directed to the side providing the needed gyro precession and to switch off when the pitch is directed to opposite side;

Losing the rocking energy in the brake process.

Here is developed the effective scheme creating the needed force moment and simultaneously saving the energy for useful utilization (FIG. 17). The force moment generator can be mounted instead of the brake 82 on the gearbox 6 (FIG. 1, 2, 4, 6, 11) or on other frame 213 (FIG. 17a) of some part of the GRP-plant having the round oscillating mechanical process starting from the gyroscope 7 including the axles 14, 17. Instead braking this generator 211 exerts the force moment to the one of the gyroscope axles directly or through the gearbox like 6. In common situation the force moment generator case 211 is mounted on the frame 213 from which the splined shaft 64 is leaded out. It is connected through the gearbox like 6 with the one of the gyroscope axles 14 or 17 so as any force moment generated by it on the shaft 64 is added to the force moments applying to one of the gyroscope axles.

The force moment value is controlled by the drive 119 (FIG. 17) through the pinion 45 revolving the gear wheel 208 and the geared dram 40 in opposite directions. And it keeps them steady in this controlled position by itself mounting on the cover 212. The cogs 215 and 216 located on the dram 40 and the wheel 208 are now set on the angle providing the required level of the force moment of the spring 218 twirling. The oscillating shaft 64 produces the twirling. For that the second control device—the cylinder 63 clutches the shaft 64 with the splined bush 207 or 210 by sliding the double splined bush 219 via the tie-tube 206 and the stock 66.

The cylinder 63 can set it to three positions: the neutral (as shown), the right—to clutch the splined bush 210 or to the left—to clutch the splined bush 207. If it is right then the angle oscillations of the splined shaft 64 are transmitted to the splined bush 210 through the double splined bush 219. These oscillations are transmitted far to the inter dram 220 but only to one direction overcoming the force of the spring 218. The shaft 64 can turn back freely owe to the overrun clutching between the bush 210 and the dram 220. Their adjacent surfaces and the rollers 209 provide the overrun clutching (example in the [1]) so that the cog 217 can be turned only toward to a reader (FIG. 17a).

When the shaft 64 and thus the bush 219 and the bush 210 are turning back the spring helps the shaft 64 to do it and gives back the accumulated energy to the GRP-plant until the cog 217 bumps on the cog 216 of the steady wheel 208. Then the motion can not meet the spring resistance far owe to overrun clutching action. But when the shaft 64 again turns forward it meets the spring 218 resistance and transmits it back as force moment to the GRP-plant. The second end of the spring 218 is still because it is held up by the outer dram 29 insisting with its cog 214 on the cog 215 of the geared dram 40 which was set and is now kept steady by the pinion 45 of the drive 119. The described circle of the force moment creating and the energy back giving is repeated automatically with the pitching process.

The opposite force moment is created against the shaft 64 when the cylinder 63 slides the double splined bush 219 to the left side and clutches the opposite inter bush 207. It can be swirled by the shaft 64 only to direction opposite of the bush 210 can be swirled. This is owe to the second overrun clutching of the bush 207 with the outer dram 29 providing by rollers 209. Overcoming the spring 218 resistance the outer drum 29 winds the spring 218 with its outside end. In the same time its inner end is held steady on the inner dram 220 owe to the cogs 217, 216 (of the wheel 208) and owe to the motionless pinion 45. The work circle is similar to the described before for the direct force moment.

It is important the force moment generator can work also when the shaft 64 does not hesitate. For that the case 211 must be turned relatively and fixed on the frame 213 up to the angle needed to have the required force moment value. The turning is performed by the drive 54 with the pinion 122 in direction opposite to desired force moment direction. To redirect the force moment the generator must be turned back and then up to the opposite angle.

7. Floating Power Plant Energized by the Heaving Process.

In conditions when the navigating is not required the power production is much easier. It is because we don't need to steer the floating craft if we are only producing the power. It is enough to keep the GAM-drift to minimum as possible. The power producing floating craft can have round shape and keep the GRP-plant as shown on the FIG. 12 but without the gearbox 5, the propulsive 139 and steering 156 complexes, any transmissions to it. The accumulated hydraulic power is converted to the electric power by any generator driven with the hydraulic motor 157.

More the absence of the navigating necessity presents the possibility to refuse from the gyroscope and to build the simplest buoyant rocking power plant (BRP-plant) as shown on the FIG. 18. The BRP-plant consists of the hull 193 (FIG. 18a) heaving under the seas action, the column 128 containing the spring 201 stretching the rope 180 winded on the winch 120 and dropped down to suspend the hollow ball 231 (FIG. 18b). The machine room (163) is hermetically sealed by the corrugated flexible hose (227) allowing the rope 180 to be kept stable by the ball 231 when the hull 193 is lifted up by a sea.

The lifting stage means also that the rope 180 is untwisted down from the winch 120 by resistance forces and the rope twists on the winch 120 stretching the spring 201. The hallow ball 231 (FIG. 18b) holds the rope 180 down mainly owe to the inertia of inner water masses and the hydrodynamic resistance of the opened flaps 236, 118, 119. The rope 180 is fixed to the central point of the winch 120 so the great holding force from the ball 231 together with two supports 22 create the force moment on the shaft of the winch 120. And it is revolving the speed-up gear 6, the spin rectifier 5, the speed-up gear 3 and at last the generator 1.

When the hull 193 is down the ball does not create the force. It goes down under base weight 238 and the flaps don't interrupt now to do it because they can clasp to the ball 231 by the water flow. To increase or reduce the ball sink capability the holes 232 can have adjustable size. Any way the submerged rope 180 does not interrupt the winch 120 to revolve back under the spring 201 action. The rest of BRP-plant work circle is the same as for GRP-plant (p. 1.2). The only difference is the amplitude of the input shaft angle motion becomes a few revolutions instead only 1/50÷1/30 revolution. It is much better for designing of the converter 'rocking to revolution'.

The BRP-plant can drift or be anchored with the anchor cable 229 united functionality of the anchor rope and the submerged electric cable transmitting the electric power on the shore. Tens and hundreds of BRP-plants can power supply a few coastal settlements.

Technical Publications:

[1] D. N. Reshetov. Machine elements. Russia. Moscow. Publishing house Mashinostroenie. 1989.

[2] J. P. Den Hartog.: Mechanics. Dover Publications, Inc. New York. 1948.

[3] Kurt & Reiner Gieck. Engineering Formula. $7^{th}$ edition. McGraw-Hill, Inc. Germany 1997.

[4] Long-range cruise captain's hand book. Russia. Moscow. Publishing house Transport. 1988.

[5] V. B. Jinkin. Theory and ship design. Russia. St-Petersburg. Publish. house Shipbuilding. 1995.

What I claim as my invention is:

1. A method of wave-powered ship propulsion by transforming a wave induced pitching motion of a ship into an amplified oscillating motion of a rocker propulsor arm, the method comprising the steps of:

providing a rear platform that is rotatably affixed aft of ship hull;

providing a gyroscope to stabilize the rear platform against pitching motion while the ship is pitching;

rotatably supporting a propulsor arm at one end from the gyroscopically stabilized platform in a depending relationship for a rotation about first horizontal axis, and further rotatably attaching the propulsor arm to the ship hull for a rotation about a second horizontal axis;

wherein a pitching motion of the ship produces a relative movement between the first axis and the second axis, which causes a leveraged rotation of the propulsor arm about the second axis to produce an amplified oscillating motion of the propulsor arm in a vertical plane to provide propulsion to the ship.

2. The method of ship propulsion of claim 1, further comprising the step of retracting the propulsor arm under the hull of the ship in a non-deployed state when not required for propulsion.

3. A wave-powered ship propulsion system for transforming a wave induced pitching motion of ship into an amplified oscillating motion of a rocker propulsor arm, the propulsion system comprising:

a gyroscopically stabilized rear platform rotatably affixed aft of ship hull, wherein the stabilized platform is isolated from a pitching motion of the ship;

a propulsor arm rotatably supported at one end from the gyroscopically stabilized platform in a depending relationship for a rotation about first horizontal axis, the propulsor arm also rotatably attached to the ship hull for a rotation about a second horizontal axis;

wherein a pitching motion of the ship produces a relative movement between the first axis and the second axis, which causes a leveraged rotation of the propulsor arm about the second axis to produce an amplified oscillating motion of the propulsor arm in a vertical plane to provide propulsion to the ship.

4. A ship propulsion system of claim 3, further comprising a retraction mechanism to retract the propulsor arm under the hull in a non-deployed state when not required for propulsion.

5. A ship propulsion system of claim 3, wherein the angle of oscillation of the propulsor arm is greater than the angle of ship pitching.

* * * * *